(12) United States Patent
Budagavi et al.

(10) Patent No.: US 9,747,255 B2
(45) Date of Patent: Aug. 29, 2017

(54) INVERSE TRANSFORMATION USING PRUNING FOR VIDEO CODING

(75) Inventors: Madhukar Budagavi, Plano, TX (US); Vivienne Sze, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 565 days.

(21) Appl. No.: 13/470,352

(22) Filed: May 13, 2012

(65) Prior Publication Data

US 2012/0287989 A1 Nov. 15, 2012

Related U.S. Application Data

(60) Provisional application No. 61/486,008, filed on May 13, 2011.

(51) Int. Cl.
| | |
|---|---|
| H04N 7/12 | (2006.01) |
| H04N 11/02 | (2006.01) |
| H04N 11/04 | (2006.01) |
| G06F 17/14 | (2006.01) |
| H04N 19/176 | (2014.01) |
| H04N 19/46 | (2014.01) |
| H04N 19/134 | (2014.01) |
| H04N 19/122 | (2014.01) |
| H04N 19/61 | (2014.01) |

(Continued)

(52) U.S. Cl.
CPC ......... *G06F 17/147* (2013.01); *H04N 19/122* (2014.11); *H04N 19/134* (2014.11); *H04N 19/14* (2014.11); *H04N 19/176* (2014.11); *H04N 19/18* (2014.11); *H04N 19/42* (2014.11); *H04N 19/46* (2014.11); *H04N 19/48* (2014.11); *H04N 19/61* (2014.11)

(58) Field of Classification Search
None
See application file for complete search history.

(56) References Cited

U.S. PATENT DOCUMENTS

| | | | | |
|---|---|---|---|---|
| 5,737,450 | A | * | 4/1998 | Hajjahmad ............... G06T 5/20 375/240.2 |
| 6,038,197 | A | * | 3/2000 | Sitton .................... G01V 1/368 367/21 |

(Continued)

OTHER PUBLICATIONS

Madhukar Budagavi, "IDCT Pruning", JCTVC-E386, Mar. 16-23, 2011, pp. 1-6, Joint Collaborative Team on Video Coding (JCT-VC) of ITU-T SG16 WP3 and ISO/IEC JTC1/SC29/WG11, Geneva, Switzerland.

(Continued)

*Primary Examiner* — Talha M Nawaz
(74) *Attorney, Agent, or Firm* — Gregory J. Albin; Charles A. Brill; Frank D. Cimino

(57) ABSTRACT

A method for decoding an encoded video bit stream in a video decoder is provided that includes determining a scan pattern type for a transform block to be decoded, decoding a column position X and a row position Y of a last non-zero coefficient in the transform block from the encoded video bit stream, selecting a column-row inverse transform order when the scan pattern type is a first type, selecting a row-column inverse transform order when the scan pattern type is a second type, and performing one dimensional (1D) inverse discrete cosine transformation (IDCT) computations according to the selected transform order to inversely transform the transform block to generate a residual block.

11 Claims, 15 Drawing Sheets

(51) Int. Cl.
*H04N 19/14* (2014.01)
*H04N 19/18* (2014.01)
*H04N 19/48* (2014.01)
*H04N 19/42* (2014.01)

(56) References Cited

U.S. PATENT DOCUMENTS

| | | | | |
|---|---|---|---|---|
| 6,151,420 A | * | 11/2000 | Wober | G06T 5/20 382/232 |
| 6,167,092 A | * | 12/2000 | Lengwehasatit | G06F 17/147 375/240.2 |
| 6,477,467 B1 | * | 11/2002 | Sitton | G01V 1/368 702/2 |
| 6,580,759 B1 | * | 6/2003 | Peng | H04N 19/176 375/240.25 |
| 7,266,149 B2 | * | 9/2007 | Holcomb et al. | 375/240.12 |
| 7,366,236 B1 | * | 4/2008 | Winger | G06F 17/147 375/240.02 |
| 2002/0122601 A1 | * | 9/2002 | Peng | H04N 19/176 382/250 |
| 2003/0152149 A1 | * | 8/2003 | Denolf | H04N 19/42 375/240.24 |
| 2005/0047508 A1 | * | 3/2005 | Ha | H04N 19/139 375/240.16 |
| 2005/0169374 A1 | * | 8/2005 | Marpe et al. | 375/240.16 |
| 2008/0152245 A1 | * | 6/2008 | El-Maleh | H04N 21/4621 382/254 |
| 2008/0304763 A1 | * | 12/2008 | Nagori | H04N 19/176 382/250 |
| 2009/0028239 A1 | * | 1/2009 | Schuur et al. | 375/240.03 |
| 2009/0232210 A1 | * | 9/2009 | Auyeung | H04N 19/61 375/240.13 |

OTHER PUBLICATIONS

Madhukar Budagavi and Vivienne Sze, "IDCT Pruning and Scan Dependent Transform Order", JCTVC-F236, Jul. 14-22, 2011, pp. 1-7, Joint Collaborative Team on Video Coding (JCT-VC) of ITU-T SG16 WP3 and ISO/IEC JTC1/SC29/WG11, Torino, Italy.

* cited by examiner

INVERSE TRANSFORMATION USING PRUNING FOR VIDEO CODING

CROSS-REFERENCE TO RELATED APPLICATIONS

This application claims benefit of U.S. Provisional Patent Application Ser. No. 61/486,008, filed May 13, 2011, which is incorporated herein by reference in its entirety.

BACKGROUND OF THE INVENTION

Field of the Invention

Embodiments of the present invention generally relate to inverse transformation using pruning in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Two dimensional (2D) block transforms, e.g., 2D discrete cosine transforms (DCT), and variants are used in video coding to reduce spatial redundancy and achieve compression. Accordingly, 2D inverse transforms, e.g., 2D inverse DCT (IDCT) are performed in video decoding as part of decompressing encoded video. A 2D IDCT is a separable transform that may be split into row and column one-dimensional (1D) IDCTs for application. The video coding standard in use typically defines the order in which the row and column IDCTs are applied so that an encoded video bit stream is decoded identically in all compliant decoders. For example, in the H.264/AVC video coding standard, the row inverse transform is applied first followed by the column inverse transform.

The high frequency region in transform blocks is typically zero due to quantization and the energy compaction properties of the transform. The knowledge that a large portion of a transform block may be zero is exploited for IDCT pruning, also referred to as partial inverse transformation, to reduce the computational complexity of an IDCT. In IDCT pruning, many 2D IDCT computations that have zero input and zero output, i.e., computations corresponding to a region having only zero values, may be eliminated to reduce computational complexity. IDCT pruning is a well known technique that is supported by existing video coding standards that use a zigzag scan pattern to scan coefficients in a transform block.

SUMMARY

Embodiments of the present invention relate to methods and apparatus for inverse transformation using pruning in video coding. In one aspect, a method for decoding an encoded video bit stream in a video decoder is provided that includes determining a scan pattern type for a transform block to be decoded, decoding a column position X and a row position Y of a last non-zero coefficient in the transform block from the encoded video bit stream, selecting a column-row inverse transform order when the scan pattern type is a first type, selecting a row-column inverse transform order when the scan pattern type is a second type, and performing one dimensional (1D) inverse discrete cosine transformation (IDCT) computations according to the selected transform order to inversely transform the transform block to generate a residual block.

In one aspect, a method for decoding an encoded video bit stream in a video decoder is provided that includes decoding a pruned transform flag in the encoded video bit stream, wherein the pruned transform flag indicates that a subset region of a transform block contains all non-zero coefficients of the transform block, wherein the subset region consists of M rows and N columns of the transform block, and inverse scanning only quantized transform coefficients of the subset region decoded from the encoded video bit stream to generate the transform block.

In one aspect, a method for pruning an inverse discrete cosine transformation (IDCT) of a transform block is provided that includes receiving a transform coefficient and a corresponding IDCT coefficient, setting a prune flag to indicate pruning when a value of the transform coefficient is zero, setting the prune flag to indicate no pruning when the value of the transform coefficient is non-zero, disabling latching of the transform coefficient for multiplication with the IDCT coefficient during a clock cycle and outputting a zero when the prune flag is set to indicate pruning, and enabling latching of the transform coefficient for multiplication with the IDCT coefficient during a clock cycle and outputting a product of the transform coefficient and the IDCT coefficient when the pruning flag is set to indicate no pruning

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
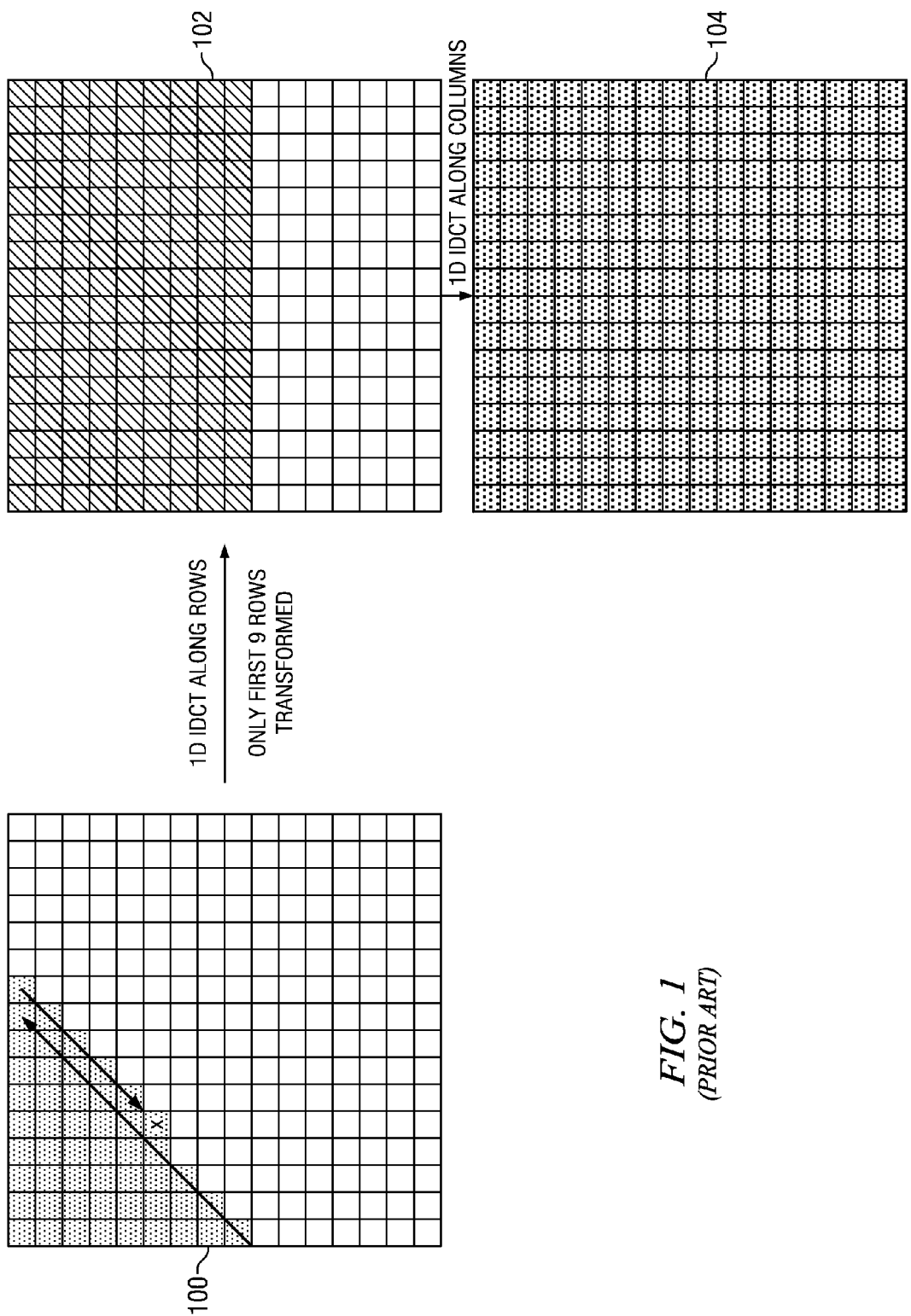
FIG. 1 is an example of prior art IDCT pruning for a zigzag scan pattern.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. For convenience of description, embodiments of the invention are described herein in reference to HEVC. One of ordinary skill in the art will understand that embodiments of the invention are not limited to HEVC.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding, JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding, JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), and B. Bross, et al., "High Efficiency Video Coding (HEVC) Text Specification Draft 6, JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6").

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, 32×32, 4×16, 16×4, 8×32, and 32×8. The sizes of the transforms units and prediction units for a CU are determined by the video encoder during prediction based on minimization of rate/distortion costs.

Some aspects of this disclosure have been presented to the JCT-VC in M. Budagavi, "IDCT Pruning", JCTVC-E386, Joint Collaborative Team on Video Coding (JCT-VC) of ITU-T SG16 WP3 and ISO/IEC JTC1/SC29/WG11, Geneva, CH, Mar. 16-23, 2011, and M. Budagavi and V. Sze, "IDCT Pruning and Scan Dependent Transform Order", JCTVC-F236, Joint Collaborative Team on Video Coding (JCT-VC) of ITU-T SG16 WP3 and ISO/IEC JTC1/SC29/WG11, Torino, IT, Jul. 14-22, 2011, which are incorporated by reference herein in their entirety.

As previously discussed, inverse transformation with pruning is a well-known technique supported by existing video coding standards such as H.264/AVC. These video coding standards primarily use a zigzag scan pattern to scan coefficients in a transform block and the largest transform size used is 8×8. Further, the 2D IDCT needed to inversely transform a block of transform coefficients may be split into row and column one-dimensional (1D) IDCTs for application. The video coding standard in use typically defines the order in which the row and column IDCTs are applied in the decoder. For row-column order, a 1D IDCT is performed on the rows of the transform block, and a 1D DCT is performed is then performed on the columns of the resulting block. For column-row order, a 1D IDCT is performed on the columns of the transform block, and a 1D DCT is performed is then performed on the rows of the resulting block.

In general, to perform IDCT pruning when a zigzag scan pattern is used, the decoder determines the position of the last non-zero coefficient in a transform block. This position may be communicated to the decoder in the encoded bit stream being decoded. Given the position on the last non-zero coefficient, the decoder can determine how many rows (or columns) of the transform block have at least one non-zero coefficient. For example, assuming a square transform block, for most possible positions of the last non-zero coefficient, the sum of the coordinates (x,y) of the position relative to the upper left corner (0,0) of the transform block added to 1 is the number of rows (or columns) L, i.e., $x+y+1=L$, with at least one non-zero coefficient.

Because the remaining rows (columns) contain only zeroes, there is no need to perform the first 1D IDCT on those rows (columns) as the computation results for those rows (columns) will be zero. Accordingly, for row-column order, the computations of the 1D IDCT are performed only on the first L rows of the transform block and the remaining rows of the resulting block are assumed to be zero. Similarly, for column-row order, the computations of the 1D IDCT are performed only on the first L columns of the transform block and the remaining columns of the resulting block are assumed to be zero.

FIG. 1 shows an example of IDCT pruning when a zigzag scan pattern is used for a transform block and row-column order for the IDCT is used. The non-shaded regions of each block indicate the region of the block containing only zero coefficients. In this example, the input transform block 100 is a 16×16 block. The position of the last non-zero coefficient in the block, indicated by the X, is (4,4). Thus, the number of rows with at least one non-zero coefficient is $x+y+1=4+4=9$. The last 7 rows are all zero. The first nine rows of the transform block are transformed using the 1D IDCT to generate the interim results block 102. Only the first 9 rows of the interim results block 102 will have non-zero values. Then, all of the columns of the interim results block 102 are transformed using the 1D IDCT to generate the final inversely transformed output block 104. In this case of a decoder, the block 104 is a block of residual values.

HEVC includes large size 2D transforms, e.g., 16×16 and 32×32, to achieve improved compression performance. The large transforms have high computational complexity so techniques such as pruning are needed to reduce this computational complexity. HEVC also supports multiple scan patterns for scanning of transform blocks for entropy coding. For example, in HEVC Draft 6, horizontal, vertical, and fixed up right scan patterns are specified. A detailed description of when these scan patterns are to be used may be found in HEVC Draft 6. Zigzag and fixed down left scan patterns have also been considered, although not currently specified in HEVC.

In general, different scan patterns are provided for intra-coded blocks where there is strong directionality in the residual depending on the intra-prediction direction. For example, when the intra-prediction direction is horizontal, only the first few rows of the transform block will be non-zero, so scanning along rows will provide better compression efficiency than other modes. In another example, zigzag scanning may provide better compression efficiency when there is little or no directionality left in the residual block but rather the residual is concentrated in the low frequency region of the transform, i.e., is concentrated around the top left corner of the transform block.

Embodiments of the invention provide for techniques for IDCT pruning when horizontal, vertical, fixed down left, and fixed up right scan patterns are used. In some embodiments, a scan adaptive transform order (row-column order or column-row order) is provided that selects the transform order based on the scan pattern type. In some embodiments, a pruned transform flag is provided, that when set by the encoder, indicates that a subset region of a particular size (e.g., 4×4, 8×8, 8×16, etc.) contains all of the non-zero coefficients in a transform block and the remainder of the block is all zeroes. The flag is then used by a decoder to determine the number of rows (columns) to be transformed for IDCT pruning. In some embodiments, a hardware architecture for IDCT pruning is provided that uses pruning information to disable computations that have a zero input and a zero output.

Figure 2:
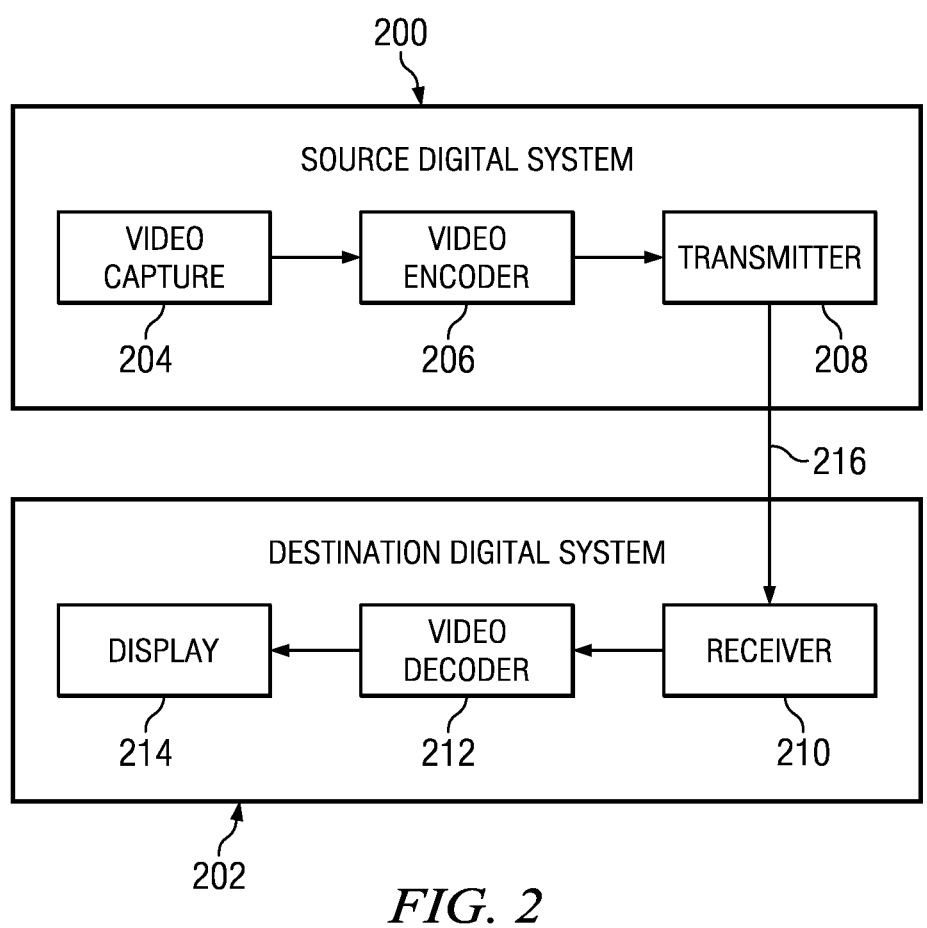
FIG. 2 is a block diagram of a digital system.

FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. The video encoder component 206 may be configured to apply IDCT pruning techniques during the encoding process as described herein. An embodiment of the video encoder component 206 is described in more detail herein in reference to FIG. 3.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence. The video decoder component 212 may be configured to apply IDCT pruning techniques during the decoding process as described herein. An embodiment of the video decoder component 212 is described in more detail below in reference to FIG. 4.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video steaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
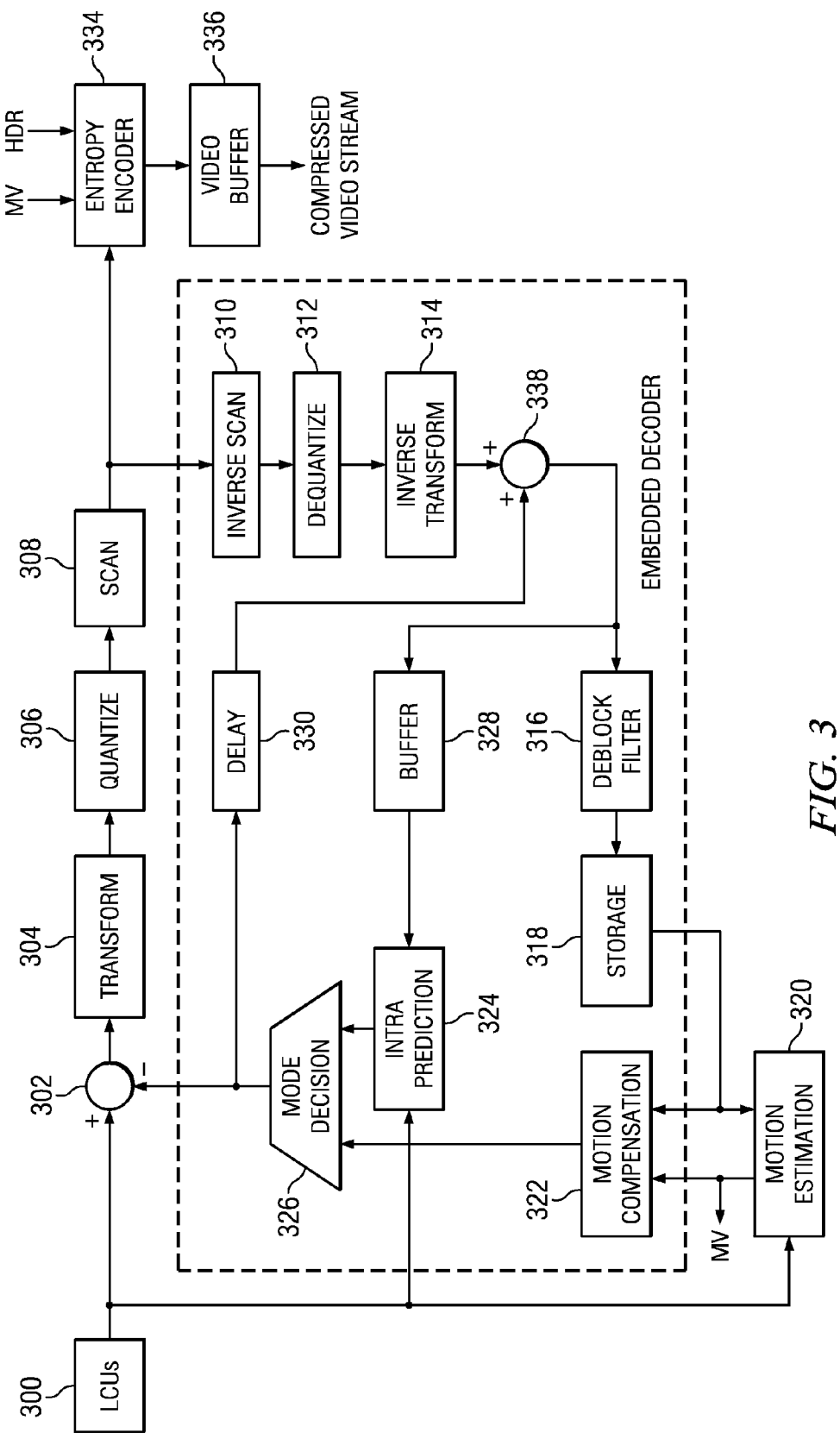
FIG. 3 is a block diagram of a video encoder.

FIG. 3 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and TU structure for each CU and provides information regarding this initial structure to the various components of the video encoder as needed.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 300 from the coding control unit are provided as one input of a motion estimation component 320, as one input of an intra-prediction component 324, and to a positive input of a combiner 302 (e.g., adder or subtractor or the like). Further, although not specifically shown, the prediction mode of each picture as selected by the coding control component is provided to a mode selector component and the entropy encoder 334.

The storage component 318 provides reference data to the motion estimation component 320 and to the motion compensation component 322. The reference data may include one or more previously encoded and decoded CUs, i.e., reconstructed CUs.

The motion estimation component 320 provides motion data information to the motion compensation component 322 and the entropy encoder 334. More specifically, the motion estimation component 320 performs tests on CUs in an LCU based on multiple inter-prediction modes (e.g., skip mode, merge mode, and normal or direct inter-prediction) and transform block sizes using reference picture data from storage 318 to choose the best motion vector(s)/prediction mode based on a rate distortion coding cost. To perform the tests, the motion estimation component 320 may begin with the CU structure provided by the coding control component. The motion estimation component 320 may divide each CU indicated in the CU structure into PUs according to the unit sizes of prediction modes and into transform units according to the transform block sizes and calculate the coding costs for each prediction mode and transform block size for each CU. The motion estimation component 320 may also compute CU structure for the LCU and PU/TU partitioning structure for a CU of the LCU by itself.

For coding efficiency, the motion estimation component 320 may also decide to alter the CU structure by further partitioning one or more of the CUs in the CU structure. That is, when choosing the best motion vectors/prediction modes, in addition to testing with the initial CU structure, the motion estimation component 320 may also choose to divide the larger CUs in the initial CU structure into smaller CUs (within the limits of the recursive quadtree structure), and calculate coding costs at lower levels in the coding hierarchy. If the motion estimation component 320 changes the initial CU structure, the modified CU structure is communicated to other components that need the information.

The motion estimation component 320 provides the selected motion vector (MV) or vectors and the selected prediction mode for each inter-predicted PU of a CU to the motion compensation component 322 and the selected motion vector (MV), reference picture index (indices), prediction direction (if any) to the entropy encoder 334

The motion compensation component 322 provides motion compensated inter-prediction information to the mode decision component 326 that includes motion compensated inter-predicted PUs, the selected inter-prediction modes for the inter-predicted PUs, and corresponding transform block sizes. The coding costs of the inter-predicted PUs are also provided to the mode decision component 326.

The intra-prediction component 324 provides intra-prediction information to the mode decision component 326 that includes intra-predicted PUs and the corresponding intra-prediction modes. That is, the intra-prediction component 324 performs intra-prediction in which tests based on multiple intra-prediction modes and transform unit sizes are performed on CUs in an LCU using previously encoded neighboring PUs from the buffer 328 to choose the best intra-prediction mode for each PU in the CU based on a coding cost.

To perform the tests, the intra-prediction component 324 may begin with the CU structure provided by the coding control. The intra-prediction component 324 may divide each CU indicated in the CU structure into PUs according to the unit sizes of the intra-prediction modes and into transform units according to the transform block sizes and calculate the coding costs for each prediction mode and transform block size for each PU. For coding efficiency, the intra-prediction component 324 may also decide to alter the CU structure by further partitioning one or more of the CUs in the CU structure. That is, when choosing the best prediction modes, in addition to testing with the initial CU structure, the intra-prediction component 324 may also chose to divide the larger CUs in the initial CU structure into smaller CUs (within the limits of the recursive quadtree structure), and calculate coding costs at lower levels in the coding hierarchy. If the intra-prediction component 324 changes the initial CU structure, the modified CU structure is communicated to other components that need the information. Further, the coding costs of the intra-predicted PUs and the associated transform block sizes are also provided to the mode decision component 326.

The mode decision component 326 selects between the motion-compensated inter-predicted PUs from the motion compensation component 322 and the intra-predicted PUs from the intra-prediction component 324 based on the coding costs of the PUs and the picture prediction mode provided by the mode selector component. The decision is made at CU level. Based on the decision as to whether a CU is to be intra- or inter-coded, the intra-predicted PUs or inter-predicted PUs are selected, accordingly.

The output of the mode decision component 326, i.e., the predicted PU, is provided to a negative input of the combiner 302 and to a delay component 330. The associated transform block size is also provided to the transform component 304. The output of the delay component 330 is provided to another combiner (i.e., an adder) 338. The combiner 302 subtracts the predicted PU from the current PU to provide a residual PU to the transform component 304. The resulting residual PU is a set of pixel difference values that quantify differences between pixel values of the original PU and the predicted PU. The residual blocks of all the PUs of a CU form a residual CU block for the transform component 304.

The transform component 304 performs block transforms on the residual CU to convert the residual pixel values to transform coefficients and provides the transform coefficients to a quantize component 306. The transform component 304 receives the transform block sizes for the residual CU and applies transforms of the specified sizes to the CU to generate transform coefficients.

The quantize component 306 quantizes the transform coefficients based on quantization parameters (QPs) and quantization matrices provided by the coding control component and the transform sizes. The quantize component 306 may also determine the position of the last non-zero coefficient in a TU according to the scan pattern type for the TU and provide the coordinates of this position to the entropy encoder 334 for inclusion in the encoded bit stream. For example, the quantize component 306 may scan the transform coefficients according to the scan pattern type to perform the quantization, and determine the position of the last non-zero coefficient during the scanning/quantization.

The quantized transform coefficients are taken out of their scan ordering by a scan component 308 and arranged sequentially for entropy coding. The scan component 308 scans the coefficients from the highest frequency position to the lowest frequency position according to the scan pattern type for each TU. In essence, the scan component 308 scans backward through the coefficients of the transform block to serialize the coefficients for entropy coding. As was previously mentioned, a large region of a transform block in the higher frequencies is typically zero. The scan component 308 does not send such large regions of zeros in transform blocks for entropy coding. Rather, the scan component 308 starts with the highest frequency position in the transform block and scans the coefficients backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 334. In some embodiments, the scan component 308 may begin scanning at the position of the last non-zero coefficient in the TU as determined by the quantize component 306, rather than at the highest frequency position.

The ordered quantized transform coefficients for a CU provided via the scan component 308 along with header information for the CU are coded by the entropy encoder 334, which provides a compressed bit stream to a video buffer 336 for transmission or storage. The header information may include the prediction mode used for the CU. The entropy encoder 334 also encodes the CU and PU structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 308 are returned to their original post-transform arrangement by an inverse scan component 310, the output of which is provided to a dequantize component 312, which outputs a reconstructed version of the transform result from the transform component 304.

The dequantized transform coefficients are provided to the inverse transform component 314, which outputs estimated residual information which represents a reconstructed version of a residual CU. The inverse transform component 314 receives the transform block size used to generate the transform coefficients and applies inverse transform(s) of the specified size to the transform coefficients to reconstruct the residual values. The inverse transform component 314 may perform techniques for IDCT pruning as described herein.

The reconstructed residual CU is provided to the combiner 338. The combiner 338 adds the delayed selected CU to the reconstructed residual CU to generate an unfiltered reconstructed CU, which becomes part of reconstructed picture information. The reconstructed picture information is provided via a buffer 328 to the intra-prediction component 324 and to an in-loop filter component 316. The in-loop filter component 316 applies various filters to the reconstructed picture information to improve the reference picture used for encoding/decoding of subsequent pictures. The in-loop filter component 316 may, for example, adaptively apply low-pass filters to block boundaries according to the boundary strength to alleviate blocking artifacts causes by the block-based video coding. The filtered reference data is provided to storage component 318.

Figure 4:
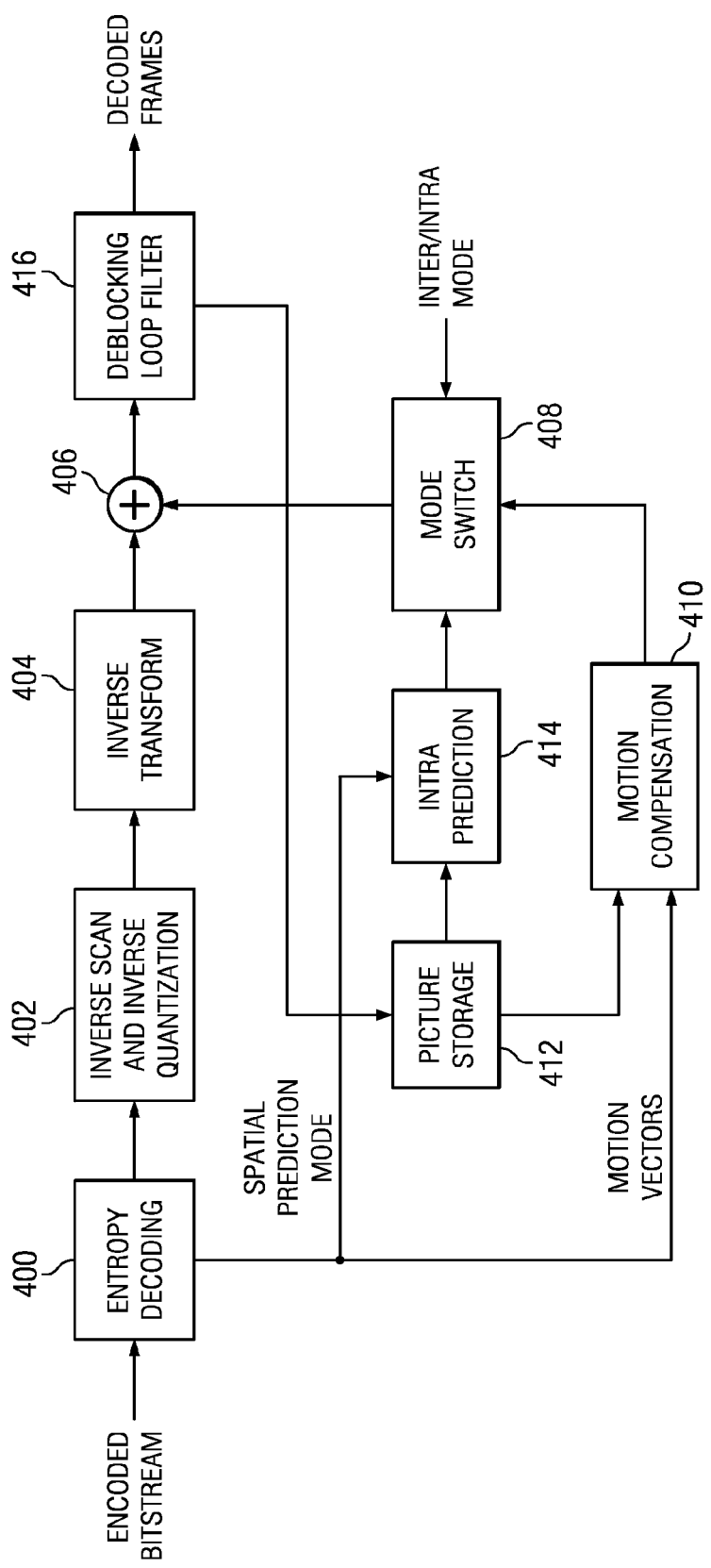
FIG. 4 is a block diagram of a video decoder.

FIG. 4 shows a block diagram of an example video decoder. The video decoder operates to reverse the encoding operations, i.e., entropy coding, quantization, transformation, and prediction, performed by the video encoder of FIG. 3 to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy coding to recover the encoded PUs and header information such as the prediction modes and the encoded CU and PU structures of the LCUs. If the decoded prediction mode is an inter-prediction mode, the entropy decoder 400 then reconstructs the motion vector(s) as needed and provides the motion vector(s) to the motion compensation component 410.

The inverse scan and inverse quantization component 402 receives entropy decoded quantized transform coefficients from the entropy decoding component 400, inverse scans the coefficients to return the coefficients to their original post-transform arrangement, i.e., performs the inverse of the scan performed by the scan component 308 of the encoder to reconstruct quantized transform blocks, and de-quantizes the quantized transform coefficients. The forward scanning in the encoder is a conversion of the two dimensional (2D) quantized transform block to a one dimensional (1D) sequence; the inverse scanning performed here is a conversion of the 1D sequence to the two dimensional quantized transform block using the same scanning pattern as that used in the encoder.

The inverse transform component 404 transforms the frequency domain data from the inverse scan and inverse quantization component 402 back to the residual CU. That is, the inverse transform component 404 applies an inverse unit transform, i.e., the inverse of the unit transform used for encoding, to the de-quantized residual coefficients to produce the residual CUs. The inverse transform component 404 may perform techniques for IDCT pruning as described herein.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode is signaled, the mode switch selects predicted PUs from the intra-prediction component 414.

The motion compensation component 410 receives reference data from storage 412 and applies the motion compensation computed by the encoder and transmitted in the encoded video bit stream to the reference data to generate a predicted PU. That is, the motion compensation component 410 uses the motion vector(s) from the entropy decoder 400 and the reference data to generate a predicted PU.

The intra-prediction component 414 receives reference data from previously decoded PUs of a current picture from the picture storage 412 and applies the intra-prediction computed by the encoder as signaled by the intra-prediction mode transmitted in the encoded video bit stream to the reference data to generate a predicted PU.

The addition component 406 generates a decoded CU by adding the predicted PUs selected by the mode switch 408 and the residual CU. The output of the addition component 406 supplies the input of the in-loop filter component 416. The in-loop filter component 416 performs the same filtering as the encoder. The output of the in-loop filter component 416 is the decoded pictures of the video bit stream. Further, the output of the in-loop filter component 416 is stored in storage 412 to be used as reference data.

Figure 5:
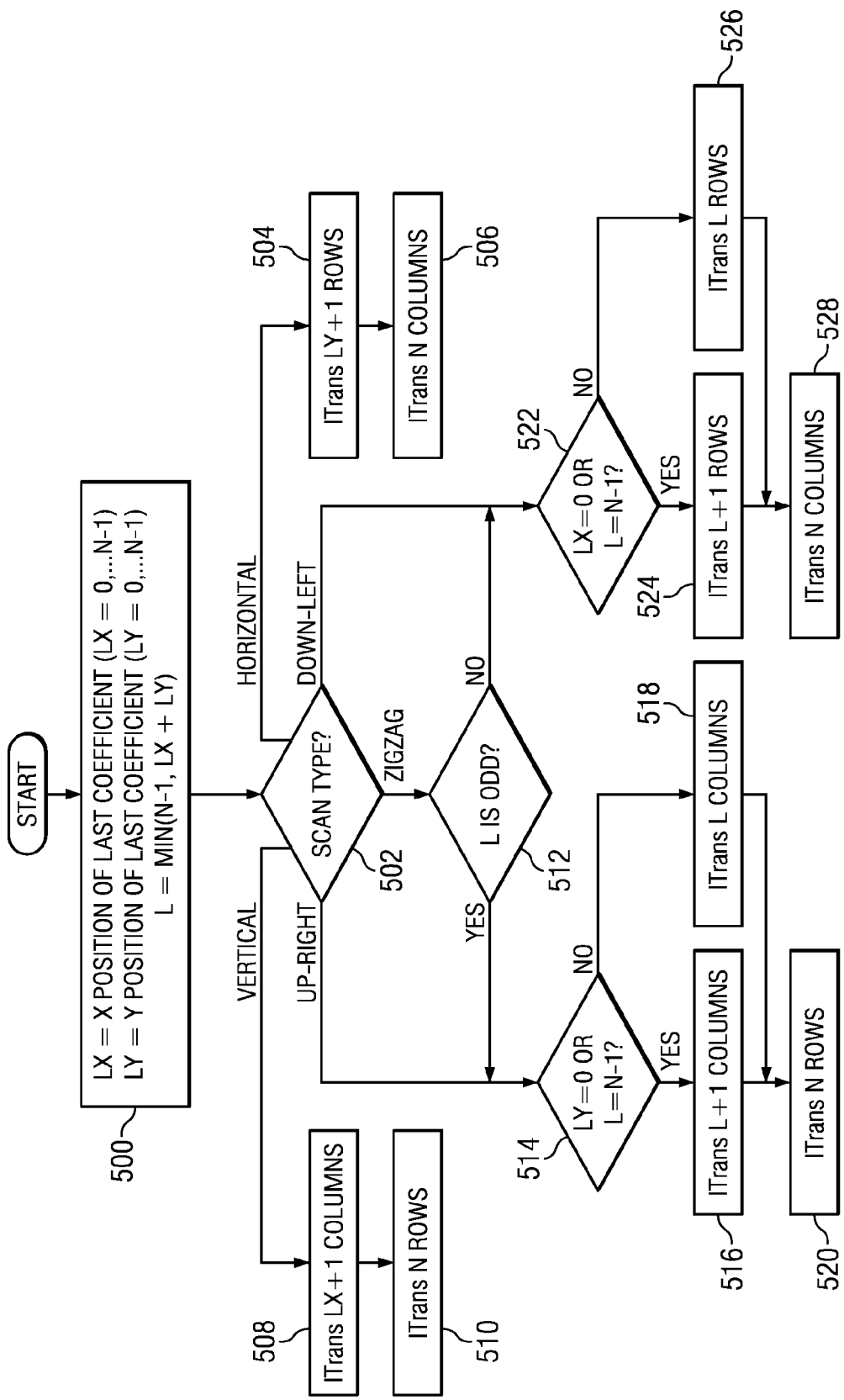
FIG. 5 is a flow diagram of a method for IDCT pruning.

FIG. 5 is a flow diagram of a method for scan adaptive selection of the inverse transform order, i.e., row-column or column-row, in a decoder. The decoder may be a standalone decoder such as that of FIG. 4 or part of an encoder such as that of FIG. 3. More specifically, the method selects the inverse transform order based on the scan pattern type used during encoding to scan the transform block. While the method is described with five scan pattern types, more or fewer scan pattern types may be considered in other embodiments. The method assumes an N×N square transform block for simplicity of description. The method is described with reference to the examples of FIGS. 6-11. In these examples, the non-shaded regions of each block indicate the region of the respective block containing only zero coefficients. Further, in these examples, the input transform block is a 16×16 block and the position of the last non-zero coefficient in the transform block is indicated by an X.

Referring now to FIG. 5, the position of the last non-zero coefficient in the transform block being decoded is determined 500. This position may be determined in any suitable way. For example, the position may be explicitly signaled in the encoded bit stream. In HEVC, the x and y coordinates of this position are available in the bit stream. A detailed description of signaling these x and y coordinates may be found, for example, in HEVC Draft 6. Note that these coordinates are assumed to be relative to the upper left corner (0,0) of the transform block. If the position signaled in the bit stream is relative to a larger block, the signaled coordinates can be adjusted to be relative to the transform block as the size of the block is known by the decoder. The variable LX is set to the X position and the variable LY is set to the Y position. The variable L is set to the minimum of N−1 and the sum of the X position and the Y position.

The scan pattern type is also determined 502. The scan pattern type may be determined in any suitable way. For example, the scan pattern type may be explicitly signaled in the bit stream and/or may be implicit in the prediction mode used for the coding unit that includes the transform block. In HEVC, the scan pattern type is implicitly signaled. For example, in HEVC, certain of the intra-prediction modes specify the scan pattern type. Thus, if the intra-prediction mode is known, the decoder can infer the scan pattern type. For Such intra-prediction modes are described, for example, HEVC Draft 6. For the inter-predicted modes, the scan pattern is defined to be the fixed up right scan pattern.

Figure 6:
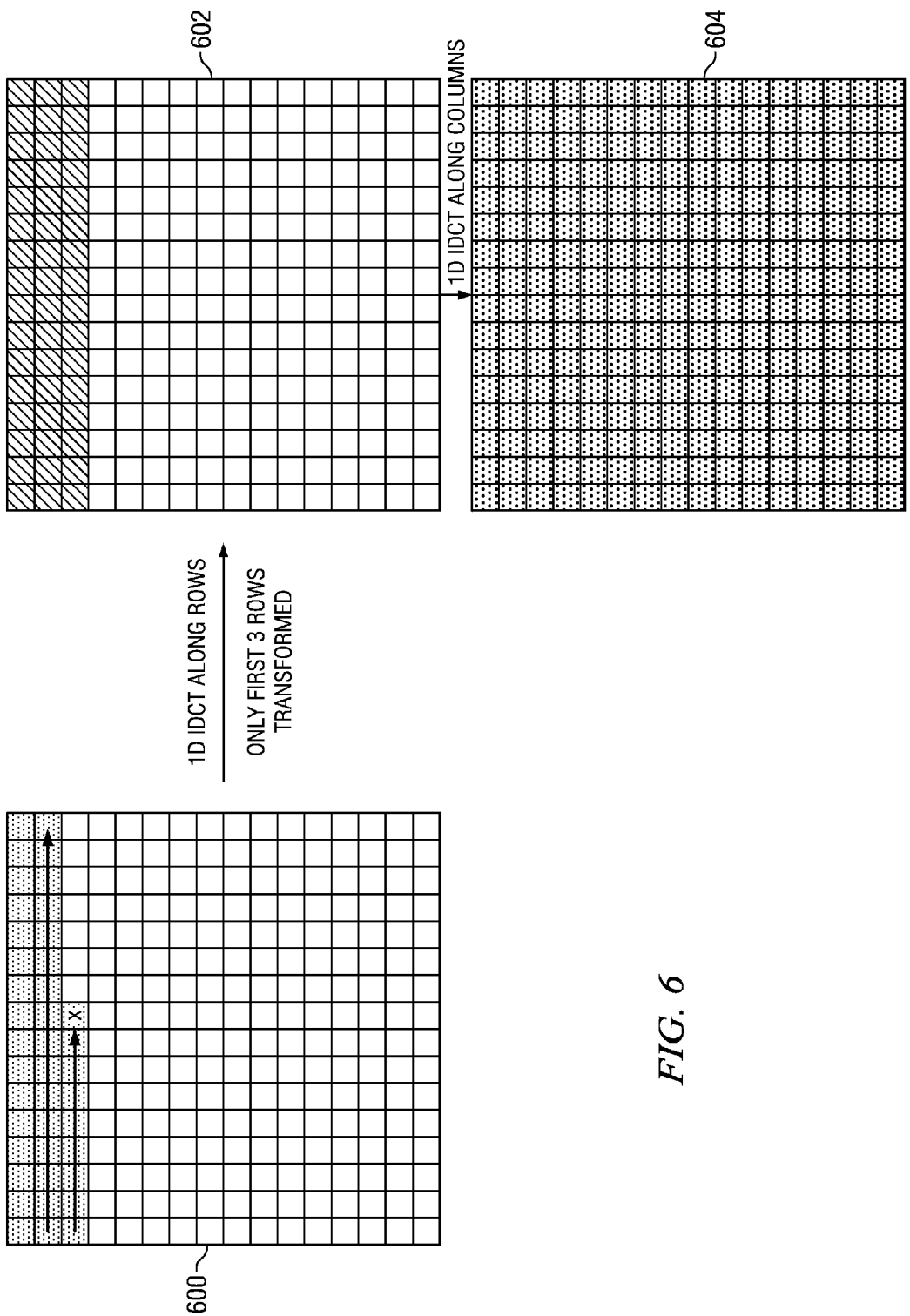
FIGS. 6-11 are examples of IDCT pruning.

Different inverse transform orders are then used to inverse transform the block based on the scan pattern type. If the scan pattern type 502 is horizontal, the row-column transform order is used. In a horizontal scan pattern, each row of the transform block is scanned sequentially from left to right. The arrows in the transform block 600 of FIG. 6 illustrate this scan pattern. The computations of the 1D IDCT are performed 504 on the first LY+1 rows of the transform block to generate the first LY+1 rows of the interim results block, and the computations of the 1D IDCT are then performed 506 on all N columns of the interim results block to generate the final residual block.

FIG. 6 shows an example of the IDCT pruning when a horizontal scan pattern type is used and the transform order is row-column. In this example, the position of the last non-zero coefficient is (2,2). Accordingly, LY=2 and LY+1=3. That is, the Y coordinate+1 determines the number of rows for which the computations of the initial IDCT should be performed. Thus, only the first 3 rows of the input transform block 600 will be transformed to generate the interim results block 602. Note that all rows of the interim results block 602 after the third row will contain zeroes. Then, all columns of the interim results block 602 are transformed with the 1D IDCT to generate the final residual block 604.

Figure 8:
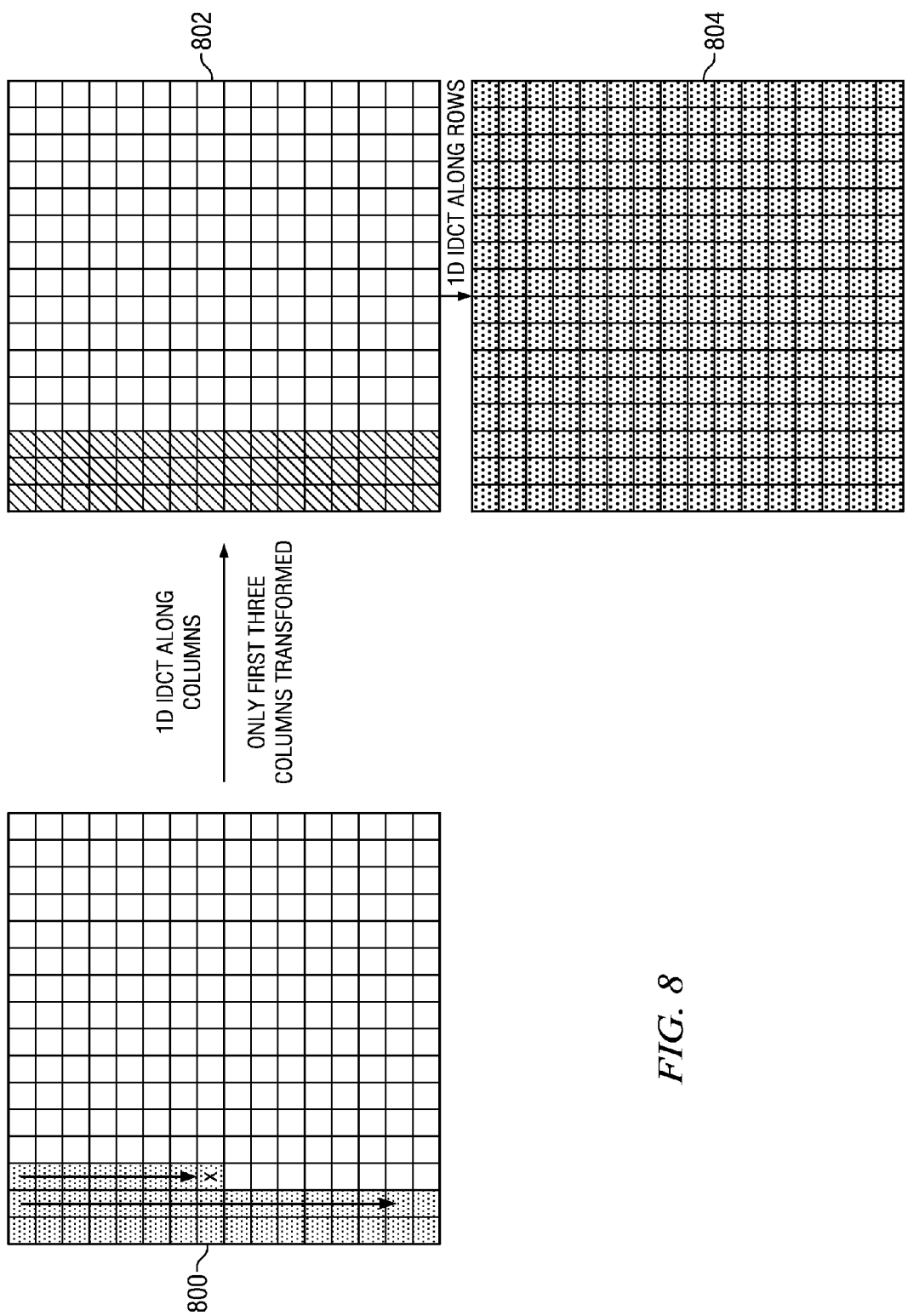

Referring again to FIG. 5, if the scan pattern type 502 is vertical, the column-row transform order is used. In a vertical scan pattern, each column of the transform block is scanned sequentially from top to bottom. The arrows in the transform block 800 of FIG. 8 illustrate this scan pattern. That is, the computations of the 1D IDCT are performed 508 on the first LX+1 columns of the transform block to generate the first LX+1 columns of the interim results block, and the computations of the 1D IDCT are then performed 510 on all N rows of the interim results block to generate the final residual block.

Figure 7:
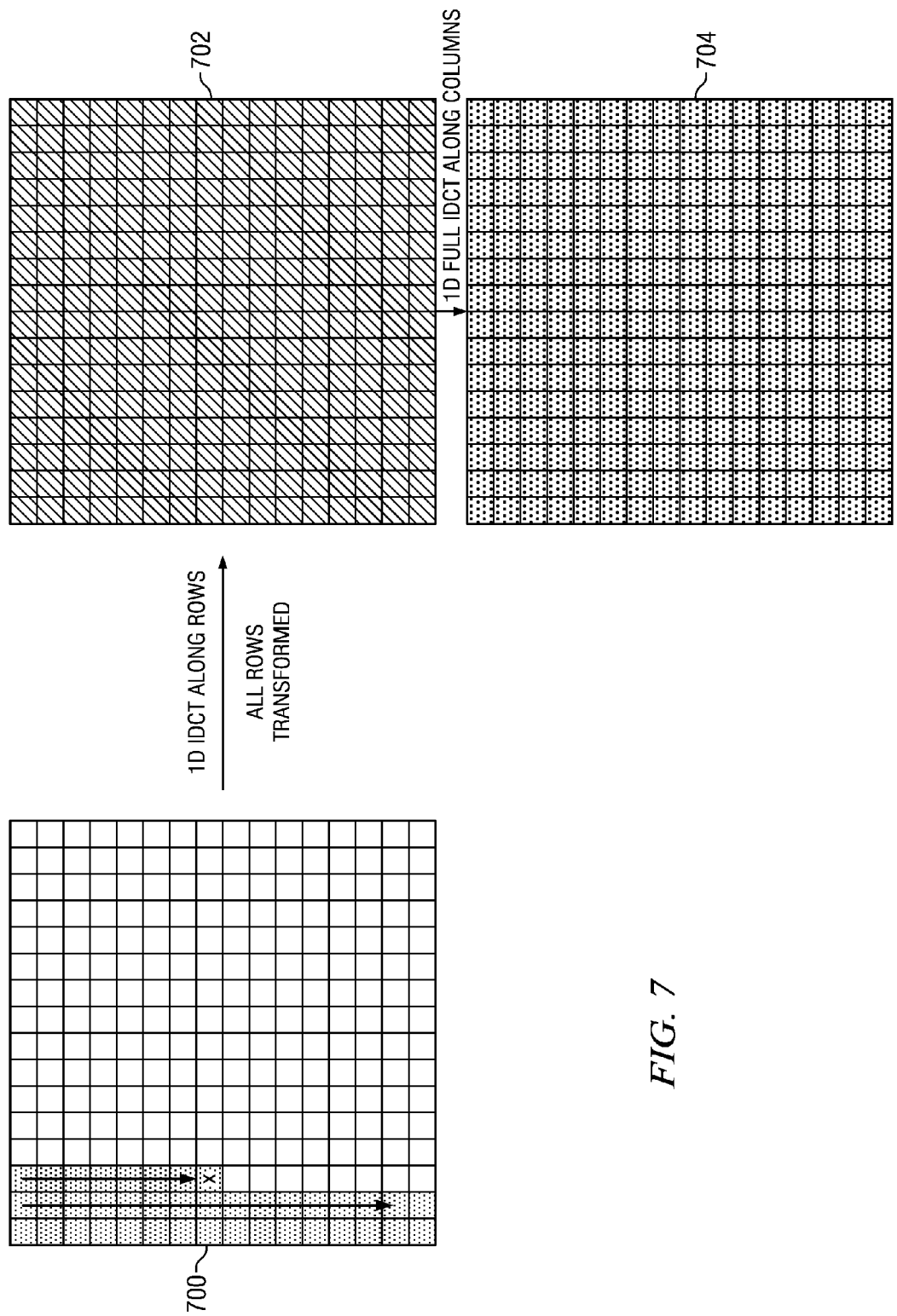

FIG. 7 shows an example illustrating why using row-column transform order as in the prior art for a vertical scan pattern type is inefficient. If the transform order is fixed to be row-column, then all rows of the transform block 700 would be transformed by the 1D IDCT to generate the interim results block 702. Then, all columns of the interim results block 702 would be transformed by the 1D IDCT to generate the final residual block 704. Contrast this to the example of FIG. 8.

FIG. 8 shows an example of the IDCT pruning when a vertical scan pattern type is used and the transform order is column-row. In this example, the position of the last non-zero coefficient is (2,2). Accordingly, LX=2 and LX+1=3. That is, the X coordinate+1 determines the number of columns for which the computations of the initial IDCT should be performed. Thus, only the first 3 columns of the input transform 800 will be transformed to generate the interim results block 802. Note that all columns of the interim results block 802 after the third column will contain zeroes. Then, all columns of the interim results block 802 are transformed with the 1D IDCT to generate the final residual block 804.

Referring again to FIG. 5, if the scan pattern type 502 is zigzag and L is not odd, then the row-column transform order is used. If X=0 or L=N−1 522, then the computations of the 1D IDCT are performed 524 on the first L+1 rows of the transform block to generate the first L+1 rows of the interim results block, and the computations of the 1D IDCT are then performed 528 on all N columns of the interim results block to generate the final residual block. If X≠0 and L≠N−1 522, then the computations of the 1D IDCT are performed 526 on the first L rows of the transform block to generate the first L rows of the interim results block, and the computations of the 1D IDCT are then performed 528 on all N columns of the interim results block to generate the final residual block.

If the scan pattern type 502 is zigzag and L is odd, then the column-row transform order is used. If Y=0 or L=N−1 514, then the computations of the 1D IDCT are performed 516 on the first L+1 columns of the transform block to generate the first L+1 columns of the interim results block, and the computations of the 1D IDCT are then performed 520 on all N rows of the interim results block to generate the final residual block. If Y≠0 and L≠N−1 514, then the computations of the 1D IDCT are performed 518 on the first L columns of the transform block to generate the first L columns of the interim results block, and the computations of the 1D IDCT are then performed 520 on all N rows of the interim results block to generate the final residual block.

FIG. 1 shows an example of the IDCT pruning when a zigzag scan pattern type is used and the transform order is row-column. In this example, the position of the last non-zero coefficient is (4,4). Accordingly, L=8 and L+1=9. Since L is even, the row-column transform order is selected. Further, since LX≠0 and L≠N−1, only the first 9 rows of the input transform 100 will be transformed to generate the interim results block 102. Note that all rows of the interim results block 102 after the ninth row will contain zeroes. Then, all columns of the interim results block 102 are transformed with the 1D IDCT to generate the final residual block 104.

Figure 9:
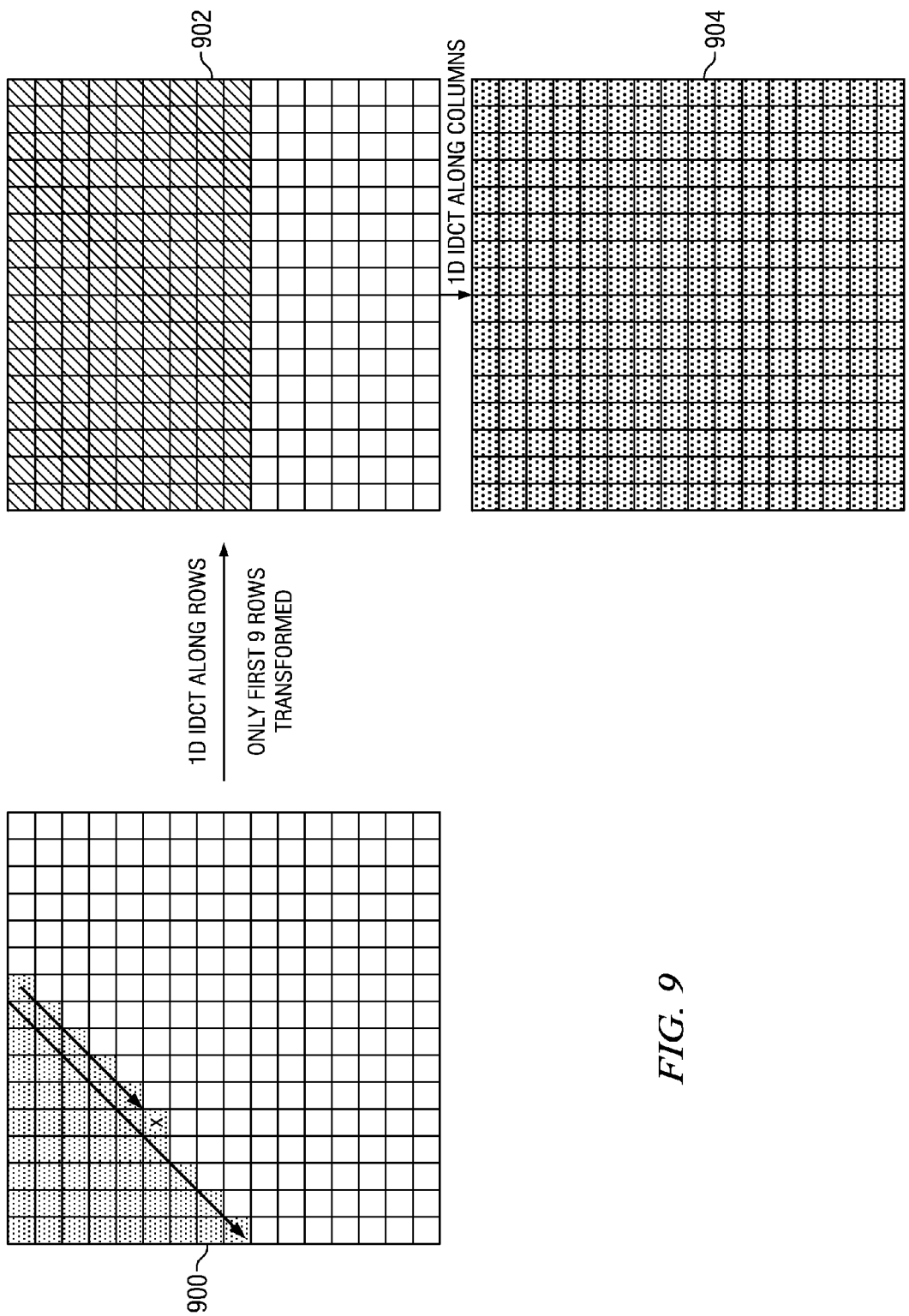

Referring again to FIG. 5, if the scan pattern type 502 is down-left, then the row-column transform order is used. In a down-left scan pattern, each left diagonal of the transform block is scanned sequentially from top to bottom. The arrows in the transform block 900 of FIG. 9 illustrate this scan pattern. If X=0 or L=N−1 522, then the computations of the 1D IDCT are performed 524 on the first L+1 rows of the transform block to generate the first L+1 rows of the interim results block, and the computations of the 1D IDCT are then performed 528 on all N columns of the interim results block to generate the final residual block. If X≠0 and L≠N−1 522, then the computations of the 1D IDCT are performed 526 on the first L rows of the transform block to generate the first L rows of the interim results block, and the computations of the 1D IDCT are then performed 528 on all N columns of the interim results block to generate the final residual block.

FIG. 9 shows an example of the IDCT pruning when a down-left scan pattern type is used and the transform order is row-column. In this example, the position of the last non-zero coefficient is (4,5). Accordingly, L=9 and L+1=1. Since LX≠0 and L≠N−1, only the first 9 rows of the input transform 900 will be transformed to generate the interim results block 902. Note that all rows of the interim results block 902 after the ninth row will contain zeroes. Then, all columns of the interim results block 902 are transformed with the 1D IDCT to generate the final residual block 904.

Figure 10:
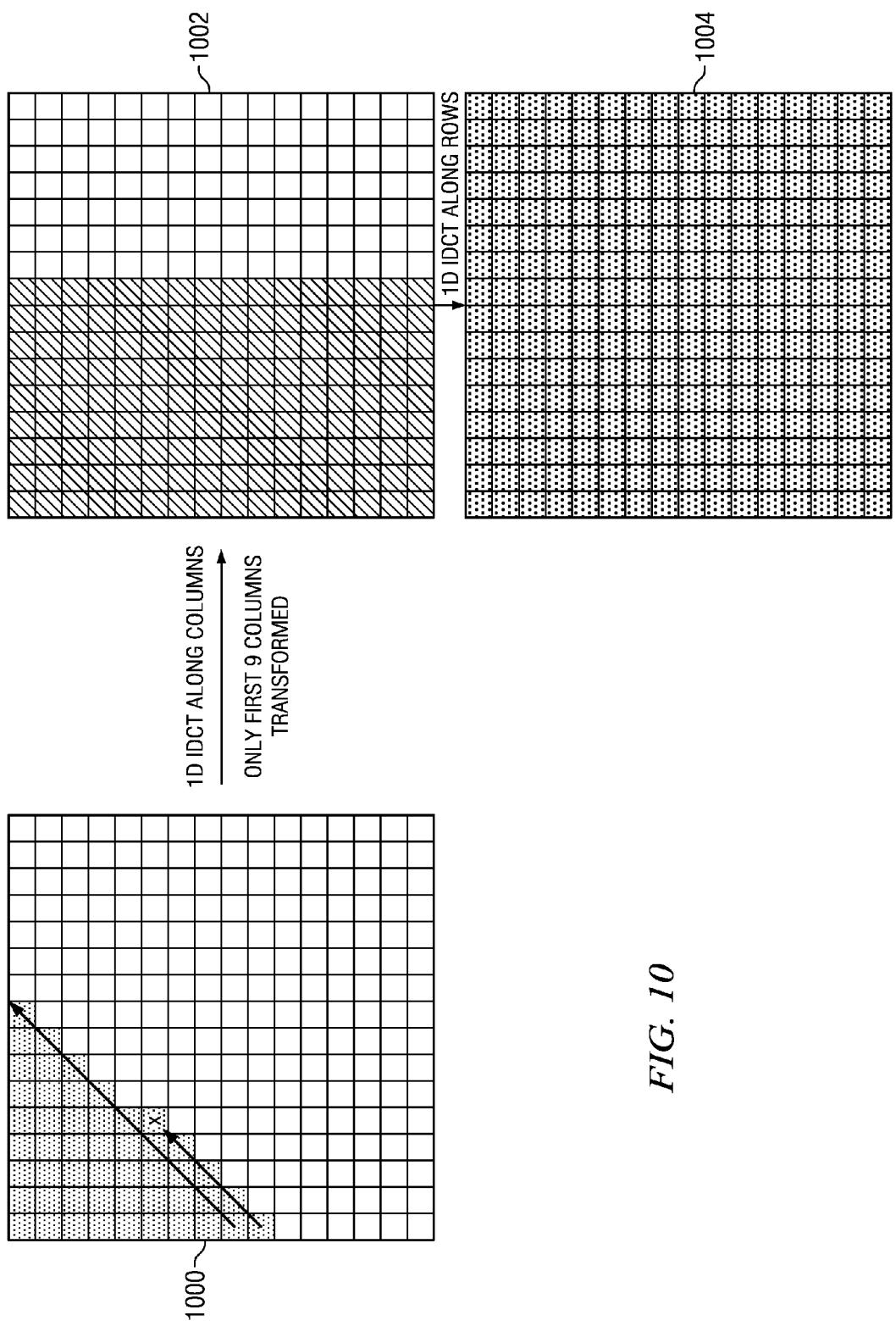

Referring again to FIG. 5, if the scan pattern type 502 is up-right, then the column-row transform order is used. In an up-right scan pattern, each right diagonal of the transform block is scanned sequentially from bottom to top. The arrows in the transform block 1000 of FIG. 10 illustrate this scan pattern. If Y=0 or L=N−1, then the computations of the 1D IDCT are performed 516 on the first L+1 columns of the transform block to generate the first L+1 columns of the interim results block, and the computations of the 1D IDCT are then performed 520 on all N rows of the interim results block to generate the final residual block. If X≠0 and L≠N−1, then the computations of the 1D IDCT are performed 518 on the first L columns of the transform block to generate the first L columns of the interim results block, and the computations of the 1D IDCT are then performed 520 on all N rows of the interim results block to generate the final residual block.

FIG. 10 shows an example of the IDCT pruning when an up-right scan pattern type is used and the transform order is column-row. In this example, the position of the last non-zero coefficient is (4,5). Accordingly, L=9 and L+1=10. Since LY≠0 and L≠N−1, only the first 9 columns of the input transform 1000 will be transformed to generate the interim results block 1002. Note that all columns of the interim results block 1002 after the ninth column will contain zeroes. Then, all rows of the interim results block 1002 are transformed with the 1D IDCT to generate the final residual block 1004.

In the above method, when the diagonal scan is in the down-left direction as shown in FIG. 9, the row-column transform order is used. When the diagonal scan is in the up-right direction as shown in FIG. 10, the column-row transform order is used. Note that if a row IDCT is applied first for the up-right scan pattern of FIG. 10, then 10 row 1D IDCTs would be performed rather than 9 column 1D IDCTs if the column-row transform order is used. In other words, if the direction of the last diagonal scan is known, the number of 1D IDCTs can be reduced by one. This can be extended to the zigzag scan pattern. The direction of the last diagonal scan in a zigzag scan pattern can be determined from the position of the last non-zero coefficient. If the sum of the coordinates of the last position is even, e.g., [1,1] or [0,2], or [2,0], then the last scan was in the up-right direction; otherwise, the last scan was in the down-left direction. Thus, for the zigzag scan pattern, for optimal pruning, the transform order can be selected based on the position of the last non-zero coefficient as illustrated in the method.

The position of the last non-zero coefficient in a transform block provides a conservative estimate of the number of rows (columns) to transform when a zigzag, fixed up right, or fixed down left scan pattern is used. Consider the example of FIG. 11. Assuming a zigzag scan pattern, if the position of the last non-zero coefficient (denoted by X) is used to determine the number of rows (columns) to transform in the first 1D IDCT, six rows (7 columns) would be transformed. However, if the residual coefficients are distributed in a smaller region of the transform block 1100 such as the 4×4 region 1101, then only four rows (columns) actually need to be transformed. The encoder can detect when the significant coefficients of a transform block are distributed in an M×N subset region of the transform block and signal such an occurrence to the decoder. The decoder can then use this information to perform more optimal IDCT pruning.

Figure 11:
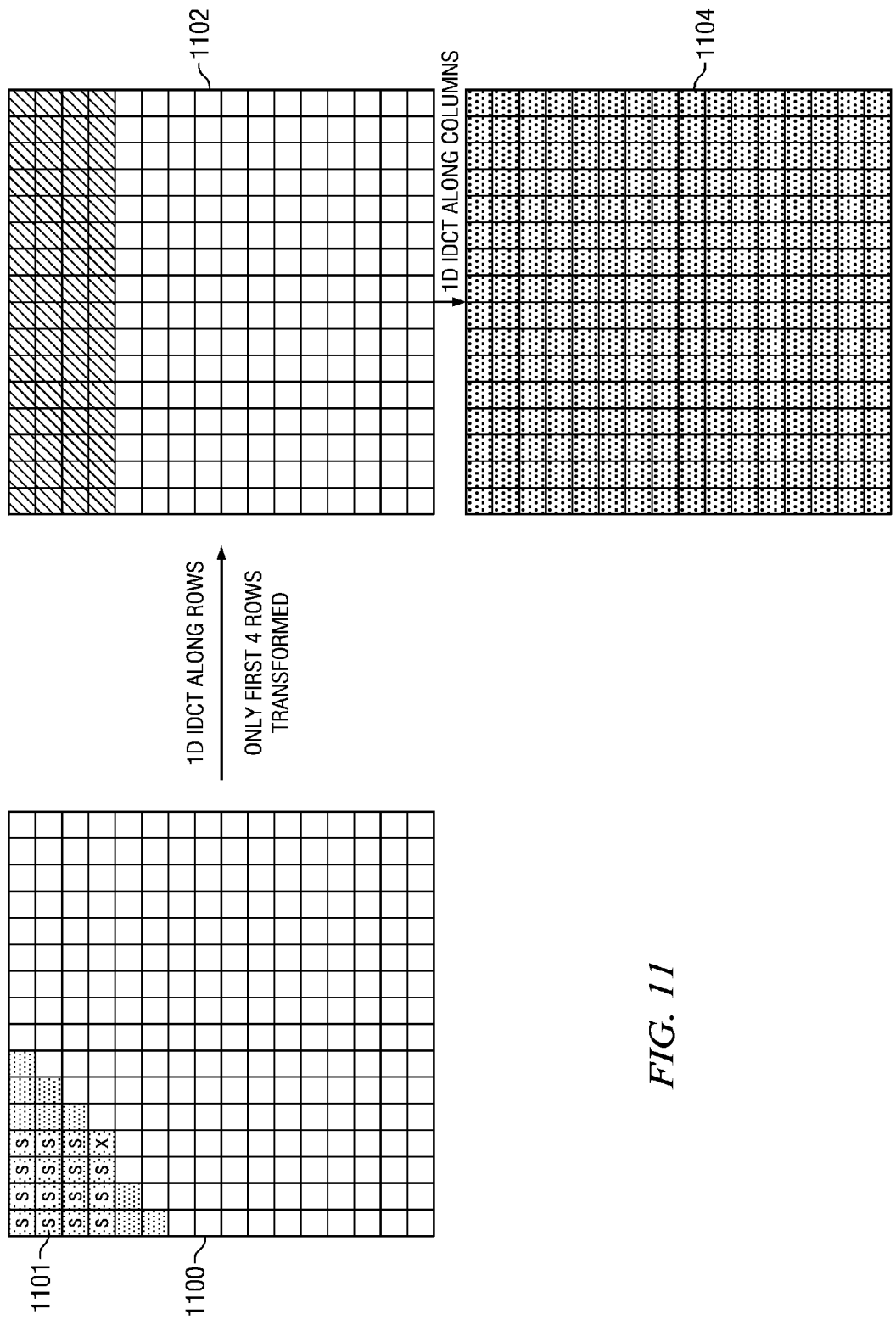

The size(s) of the subset region(s), i.e., the values of M and N, may be set by the video coding standard in use and/or may be signaled at the transform unit level, the coding unit level, the LCU level, the slice level, in a picture parameter set, and/or in the sequence parameter set. For example, the video coding standard may specify only one acceptable value for M and for N, in which case there would be no need to signal the size to the decoder. In another example, the video coding standard may specify multiple acceptable sizes for a subset region, in which case the encoder would signal the specific size used at some level. In some embodiments, a specified size for subset region is M=N=4 as shown in the example of FIG. 11.

Figure 12A:
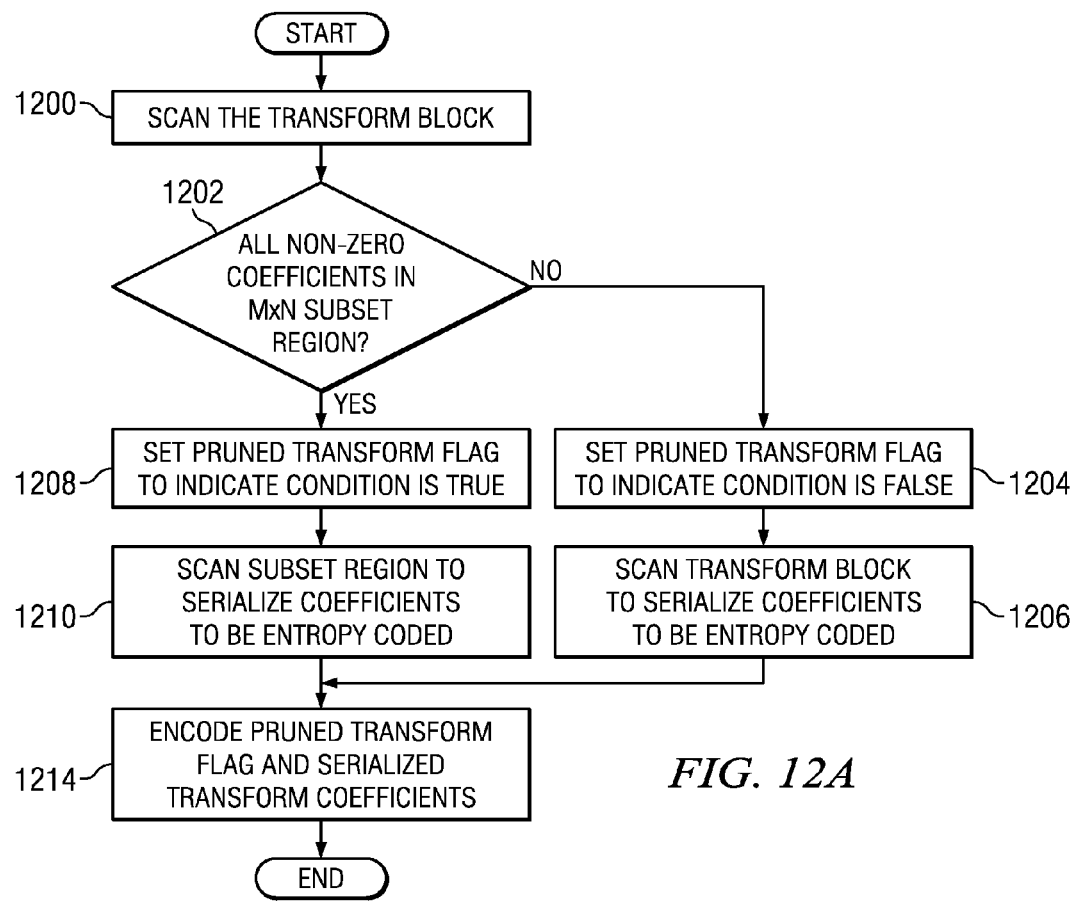
FIGS. 12A and 12B are flow diagrams of methods.

FIG. 12A is a flow diagram of a method for setting a pruned transform flag for a transform block in an encoder. Initially, the quantized transform block is scanned 1200 to determine if all non-zero coefficients of the quantized transform block are in an M×N subset region of the transform block. Any suitable scanning technique may be used to make this determination. In some embodiments, the quantized transform block is scanned according to the scan pattern type for the block to make this determination.

If all of the non-zero coefficients are in the M×N subset region 1202, the pruned transform flag is set 1208 to indicate this condition to the decoder. The M×N subset region is then scanned to serialize 1210 the coefficients to be entropy coded. The pruned transform flag and the serialized transform coefficients of the M×N subset region are then entropy coded 1214 and added to the encoded bit stream.

As was previously described in reference to the scan component 308 of FIG. 3, quantized transform coefficients in a quantized transform block are scanned to arrange them in serial order for entropy coding and to avoid entropy coding of large regions of zero value coefficients. Because it is known that all of the non-zero coefficients of the transform block are in the M×N subset region, only this region needs to be scanned to serialize the coefficients in the region and there is no need to search for the first non-zero coefficient. The subset region is scanned according to the scan pattern type for the transform block.

If all of the non-zero coefficients are not in the M×N subset region 1202, the pruned transform flag is set 1204 to indicate to the decoder that this condition is not true. The quantized transform block is then scanned 1206 according to the scan pattern for the block to serialize the coefficients to be entropy coded. The pruned transform flag and the serialized transform coefficients of quantized transform block are then entropy coded 1214 and added to the encoded bit stream.

In some embodiments of the above method, the dimensions M and N of the subset region are also encoded at the appropriate level in the encoded bit stream.

Figure 12B:
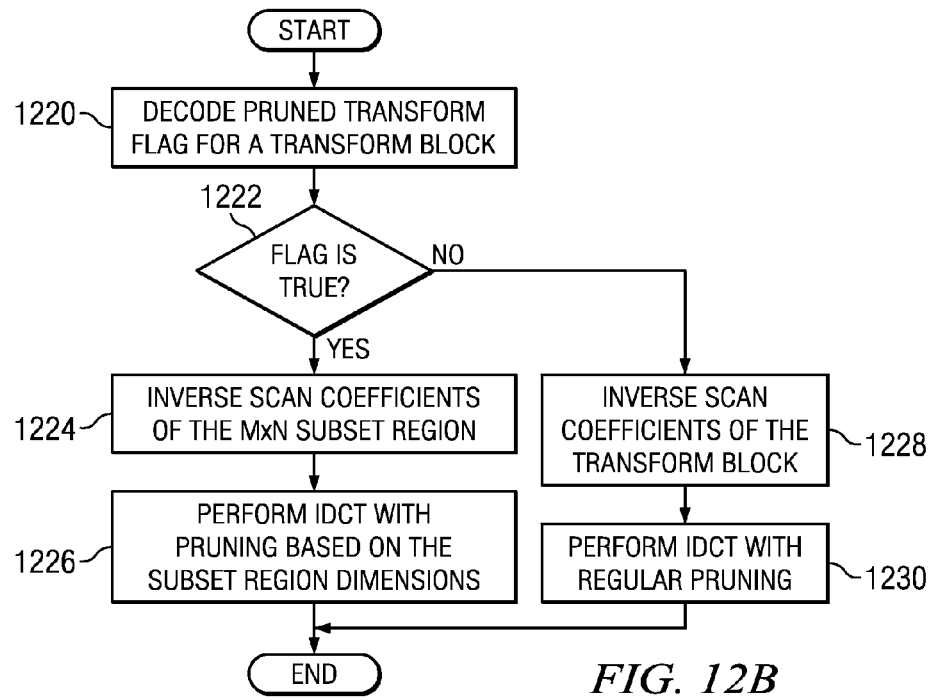

FIG. 12B is a flow diagram of a method for IDCT pruning in a decoder in which IDCT pruning may be performed responsive to a pruned transform flag. Initially, the pruned transform flag for a transform block is decoded 1220. In embodiments where the dimensions of the M×N subset are signaled, the dimensions are also decoded at whatever level they are signaled. If pruned transform flag is true, then all the non-zero coefficients of the transform block to be decoded are known to be in an M×N subset region of the block. The M×N quantized transform coefficients are decoded from the encoded bit stream and inverse scanned 1224 to recreate the quantized transform block. The scan pattern type for the transform block may be determined as previously described. Although not specifically shown, the quantized transform block is de-quantized to recreate the transform block.

The transform block is then inverse transformed with pruning 1226 based on one of the subset region dimensions to generate a residual block. For example, if M=N, then the number of rows (columns) to transform in the first 1D IDCT is M. In another example, the inverse transform order (row-column or column-row) may be selected based on the values of M and N. If M>N, then row-column order is selected and the first M rows of the transform block are transformed to generate the interim results block. If M<N, then column-row order is selected and the first N columns of the transform block are transformed to generate the interim results block. If M=N, a default inverse transform order is used, where the default is either row-column order or column-row order.

If pruned transform flag is false, then all the non-zero coefficients of the transform block to be decoded are known not to be in an M×N subset region of the block. The quantized transform coefficients are decoded from the encoded bit stream and inverse scanned 1228 to recreate the quantized transform block. Although not specifically shown, the quantized transform block is de-quantized to recreate the transform block. The transform block is then inverse transformed with regular pruning 1230 to generate a residual block. The regular pruning may be any suitable IDCT pruning technique, such as those previously described herein. For example, the regular pruning may be performed according to the scan pattern type used during encoding to scan the transform block. In another example, an embodiment of the method of FIG. 5 may be used for the regular pruning.

Each of the above IDCT pruning techniques can be successfully used to reduce computational complexity for transform blocks in which the majority of the block region is zero. In some embodiments, a further reduction in complexity may be achieved by pruning within the 1D IDCTs in each of these techniques to eliminate multiplication by 0 for those coefficients in the transform block or the interim results block known to be zero. Consider the example of FIG. 1. As was previously explained, in this example, 1D IDCT computations would be performed on only the first 9 rows of the transform block 100 to generate the interim results block 102. Note that in for the first 9 rows of the transform block 100, only a subset of the coefficients in each row may be non-zero; the remaining coefficients are known to be 0. For example, in the first row, the last 6 coefficients are known to be zero and in the $9^{th}$ row, all the coefficients but the first one are known to be 0. For each of the 9 1D IDCTs, the multiplications for the coefficients known to be 0 may be eliminated as the result of each is known to be 0. Similarly, the 1D IDCTS performed on the columns of the interim results block 102 may be pruned within to eliminate the multiplications for the last 7 coefficients of each column as these coefficients are known to be zero.

In the example of FIG. 6, the 1D IDCT on the third row of the transform block 600 may be pruned to eliminate the multiplications for the last 7 coefficients of the row, and the 1D IDCTs on each of the columns of the interim results block 602 may each be pruned to eliminate the multiplications for the last 13 coefficients of each column. In the example of FIG. 8, the 1D IDCT on the third column of the transform block 800 may be pruned to eliminate the multiplications for the last 8 coefficients of the column, and the 1D IDCTs on each of the rows of the interim results block 802 may each be pruned to eliminate the multiplications for the last 13 coefficients of each row. In the example of FIG. 9, the 1D IDCTs on the first 9 rows of the transform block 900 may be pruned to eliminate the multiplications for coefficients known to be zero in each row, and the 1D IDCTs on each of the columns of the interim results block 902 may each be pruned to eliminate the multiplications for the last 7 coefficients of each column.

In the example of FIG. 10, the 1D IDCTs on the first 9 columns of the transform block 1000 may be pruned to eliminate the multiplications for coefficients known to be zero in each column, and the 1D IDCTs on each of the rows of the interim results block 1002 may each be pruned to eliminate the multiplications for the last 7 coefficients of each row. In the example of FIG. 11, the 1D IDCTs on the first 4 rows of the transform block 1100 may be pruned to eliminate the multiplications for the last 12 coefficients in each row, and the 1D IDCTs on each of the columns of the interim results block 1102 may each be pruned to eliminate the multiplications for the last 12 coefficients of each column.

IDCT pruning in the context of a zigzag scanning pattern is a well-known technique for reducing computational complexity in software implementations of video coding standards. However, IDCT pruning is not known to have been studied in the context of hardware implementation. Hardware implementations of video codecs are increasingly becoming essential to support high definition resolutions at high frame rates. Reduction of power consumption is very important because of surging popularity of mobile battery operated devices such as the iPad and other tablet computers and the iPhone and other smart phones.

Power consumption is closely related to switching activity, which determines how often the capacitance is charged (when a signal goes from 0→1). To maximize the impact of IDCT pruning in hardware, it is important to reduce any unnecessary switching that may be caused by setting the inputs to zero. For instance, if the inputs (in binary) are 1110→1010→1111, only the $2^{nd}$ and $4^{th}$ bit need to switched, i.e., changed, from 0 to 1 when going from the $2^{nd}$ input to the $3^{rd}$ input. However, if with IDCT pruning, the $2^{nd}$ input is set to zero, then all 4 bits must be switched to go from the $2^{nd}$ input to the $3^{rd}$ input (0000→1111).

Figure 13:
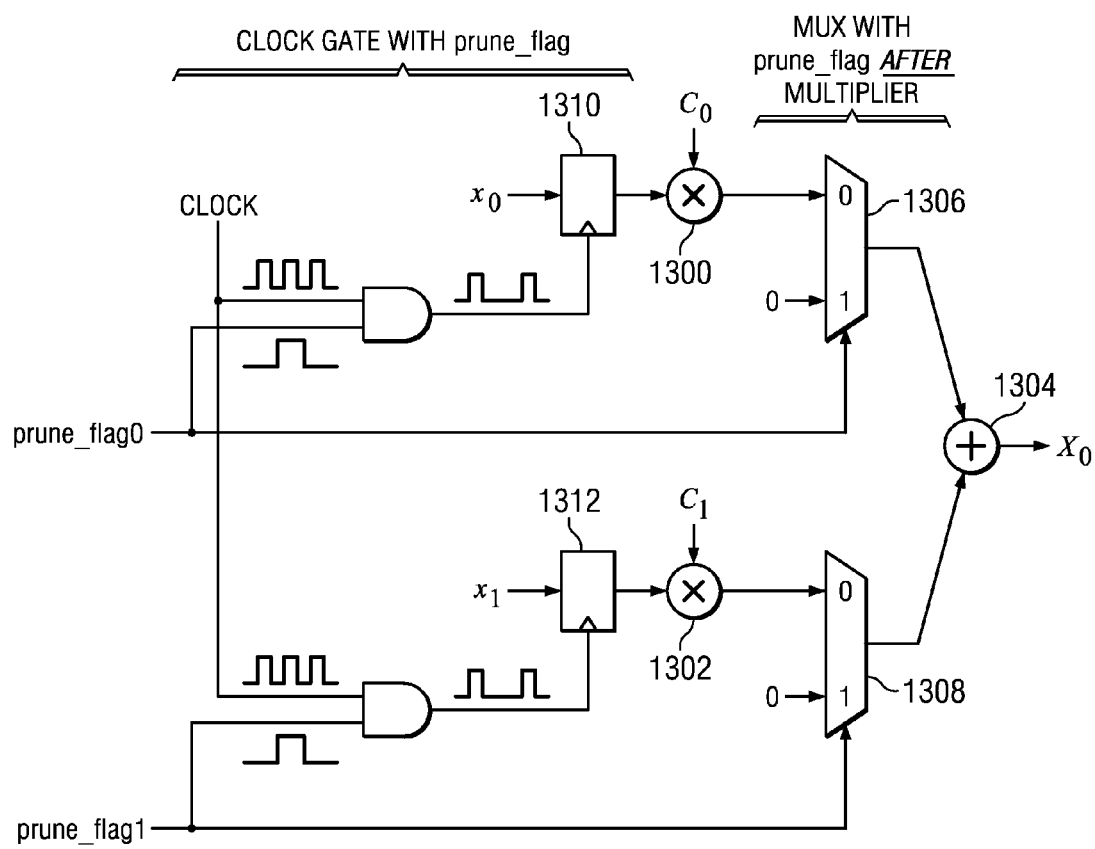
FIG. 13 is a block diagram of an example IDCT pruning architecture.

In some embodiments, a hardware matrix multiplication architecture for IDCT pruning is provided that may reduce power consumption during video decoding. In this architecture, pruning information, i.e., the coefficients which are zero in a row or column of a transform block, is used to clock gates and disable computations that have zero input and zero output. FIG. 13 shows a simple example with two multipliers 1300, 1302 and one adder 1304 which may be a part of a larger inverse transform circuit. The number of multipliers (and adders) in embodiments of the architecture may vary and is a design decision.

In FIG. 13, x0 and x1 are input coefficient values from a row (column) of the transform block and c0 and c1 are the IDCT coefficients corresponding to the input values. The IDCT coefficients c0 and c1 are inputs to respective multipliers 1300, 1302. Individual prune flags, prune_flag0 and prune_flag1, are used to clock gate inputs to respective multipliers 1300, 1302. When x0 is zero, prune_flag0 is set to 1; otherwise, it is set to 0. When x1 is zero, prune_flag1 is set to 1; otherwise, it is set to 0.

When a prune_flag for x0 and/or x1 is set to 1, the clock is disabled at the corresponding latch 1310, 1312. In this case, the previous values of x0 and/or x1 are retained and there is no switching of circuits in the respective multipliers 1300, 1302. Because there is no switching, there is no power consumption at one or both of the multipliers 1300, 1302 (i.e., the multiplier is bypassed when the corresponding prune_flag is 1). The outputs of the multipliers 1300, 1302 are muxed 1306, 1308 with 0 with the selection made according to the respective prune_flag. If a prune_flag is 1, the output of the respective multiplexor 1306, 1308 is 0, which is passed to the adder 1304.

When a prune_flag for x0 and/or x1 is set to 0, the clock is enabled at the corresponding latch 1310, 1312, thus passing the current value of x0 and/or x1 to the respective multiplier 1306, 1308. The multiplication is performed and passed to the respective multiplexor 1306, 1308. If a prune_flag is 0, the output of the respective multiplexor 1306, 1308 is the output of the respective multiplier 1300, 1302 which is passed to the adder 1304. The adder 1304 adds the outputs of the multiplexors 1306, 1308. Note that in architectures with more than pruning multiplication circuits such as the ones of FIG. 13, an adder tree may be used combine the outputs of the pruning multiplication circuits. The prune flags may be used in a fashion to similar that used to bypass the multiplication in order to bypass an adder in the tree if the output of the adder will be 0, i.e., if the prune flags of both inputs to the adder are zero.

Figure 14:
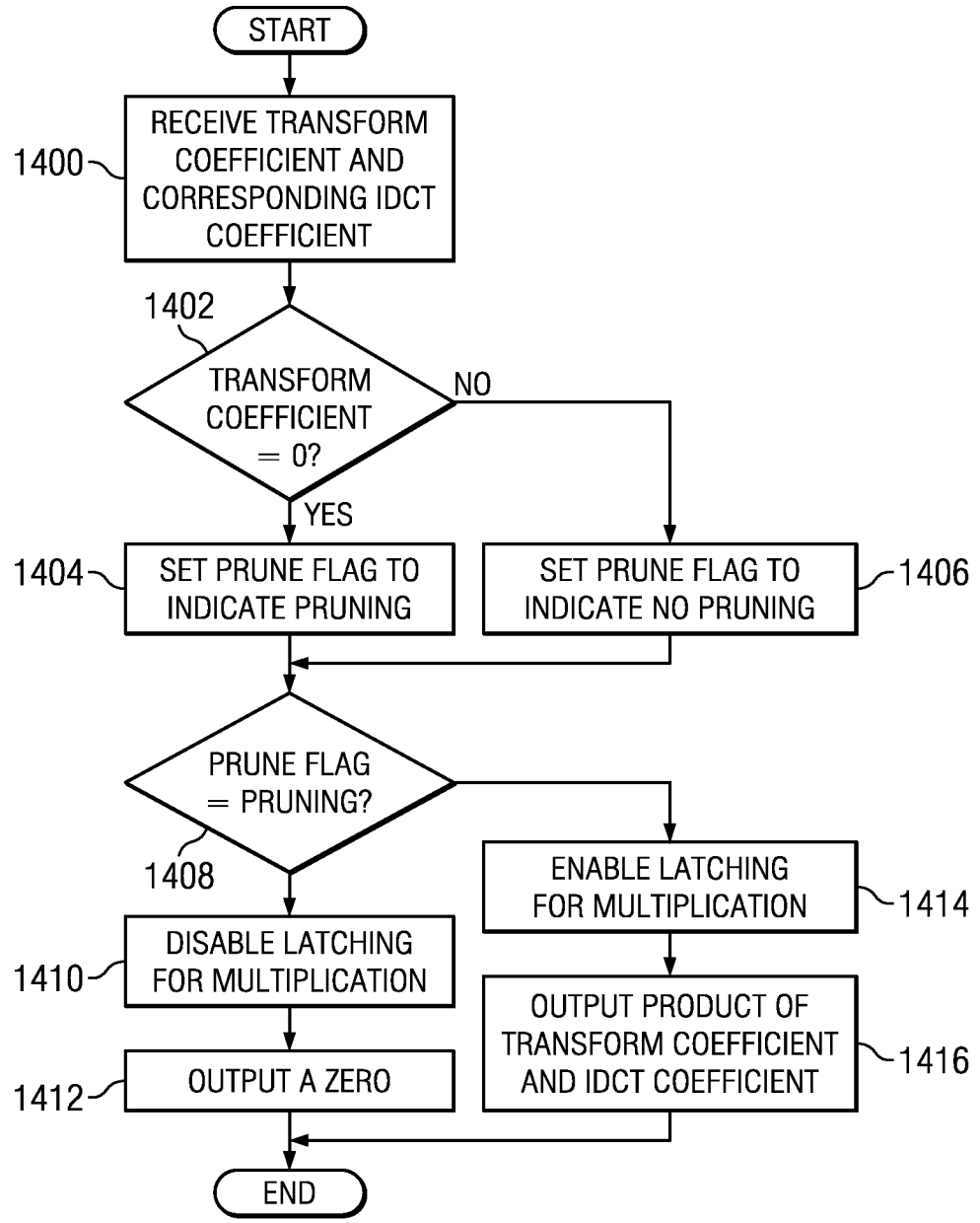
FIG. 14 is a flow diagram of a method for IDCT pruning.

FIG. 14 is a flow diagram of a method for pruning of zero value computations in a matrix multiplication hardware architecture for performing IDCT of transform blocks. This method may be performed for each transform coefficient of the transform block. Further, the method may be performed in parallel for two or more transform coefficients in the same row or column of the transform block. Initially, a transform coefficient of the transform block and the corresponding IDCT coefficient of an IDCT matrix are received 1400. If the transform coefficient is 0 1402, a prune flag is set 1404 to indicate pruning of the multiplication operation. Otherwise, the prune flag is set 1406 to indicate no pruning of the multiplication operation.

If the prune flag indicates pruning 1408, latching of the transform coefficient for multiplication with the IDCT coefficient is disabled 1410 during a clock cycle, and a zero is output 1412. If the prune flag does not indicate pruning 1408, latching of the transform coefficient for multiplication with the IDCT coefficient is enabled 1414 during a clock cycle, and the product of the transform coefficient and the IDCT coefficient is output 1416.

Figure 15:
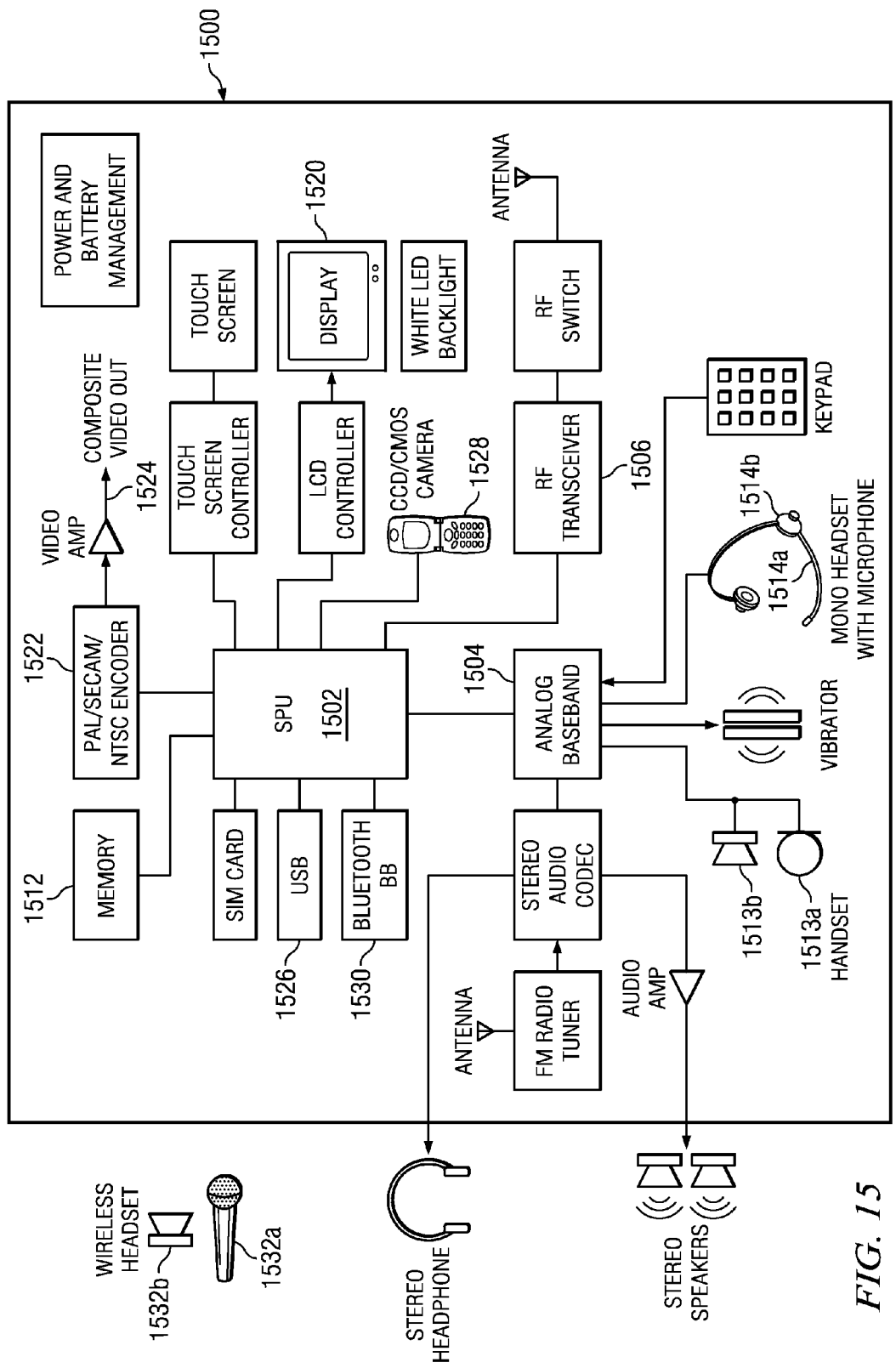
FIG. 15 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, a set top box, a digital video recorder, etc.). FIG. 15 is a block diagram of a digital system 1500 (e.g., a mobile cellular telephone) that may be configured to use techniques described herein.

As shown in FIG. 15, the signal processing unit (SPU) 1502 includes a digital signal processing system (DSP) that includes embedded memory and security features. The analog baseband unit 1504 receives a voice data stream from the handset microphone 1513a and sends a voice data stream to the handset mono speaker 1513b. The analog baseband unit 1504 also receives a voice data stream from the microphone 1514a or 1532a and sends a voice data stream to the mono headset 1514b or wireless headset 1532b. The analog baseband unit 1504 and the SPU 1502 may be separate ICs. In many embodiments, the analog baseband unit 1504 does not embed a programmable processor core, but performs processing based on configuration of audio paths, filters, gains, etc being setup by software running on the SPU 1502.

The display 1520 may display pictures and video sequences received from a local camera 1528, or from other sources such as the USB 1526 or the memory 1512. The SPU 1502 may also send a video sequence to the display 1520 that is received from various sources such as the cellular network via the RF transceiver 1506 or the Bluetooth interface 1530. The SPU 1502 may also send a video sequence to an external video display unit via the encoder unit 1522 over a composite output terminal 1524. The encoder unit 1522 may provide encoding according to PAL/SECAM/NTSC video standards. The SPU 1502 includes functionality to perform the computational operations required for video encoding and decoding. In one or more embodiments, the SPU 1502 is configured to perform computational operations for applying one or more techniques for IDCT pruning during the encoding process as described herein. Software instructions implementing all or part of the techniques may be stored in the memory 1512 and executed by the SPU 1502, for example, as part of encoding video sequences captured by the local camera 1528. The SPU 1502 is also configured to perform computational operations for applying one or more techniques for IDCT pruning as described herein as part of decoding a received coded video sequence or decoding a coded video sequence stored in the memory 1512. Software instructions implementing all or part of the techniques may be stored in the memory 1512 and executed by the SPU 1502.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments and examples have been described herein assuming a square transform block. Transform blocks may also be rectangular, e.g., 8×16, 16×8, 16×32, 32×16, etc. One of ordinary skill in the art will understand embodiments that include rectangular transform blocks without need of further description.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for decoding an encoded video bit stream in a video decoder, the method comprising:
    decoding a pruned transform flag in the encoded video bit stream, wherein the pruned transform flag indicates that a subset region of a transform block contains all non-zero coefficients of the transform block, wherein the subset region consists of M rows and N columns of the transform block;
    inverse scanning only quantized transform coefficients of the subset region decoded from the encoded video bit stream to generate the transform block; and
    performing one dimensional (1D) inverse discrete cosine transformation (IDCT) computations on the transform block to generate a residual block, wherein one of a value of M or N of the subset region signaled by the pruned transform flag is used to determine pruning of the 1D IDCT computations, wherein performing the 1D IDCT computations includes:
    receiving a transform coefficient and a corresponding IDCT coefficient;
    setting a prune flag to indicate pruning when a value of the transform coefficient is zero;
    setting the prune flag to indicate no pruning when the value of the transform coefficient is non-zero;
    disabling latching of the transform coefficient for multiplication with the IDCT coefficient during a clock cycle and outputting a zero when the prune flag is set to indicate pruning; and
    enabling latching of the transform coefficient for multiplication with the IDCT coefficient during a clock cycle and outputting a product of the transform coefficient and the IDCT coefficient when the pruning flag is set to indicate no pruning.

2. The method of claim 1, wherein M=N=4.

3. The method of claim 1, wherein performing the 1D IDCT computations comprises:
    using a column-row inverse transform order when N>M, wherein 1D IDCT computations are performed on only N columns of the transform block to generate an interim results block; and
    using a row-column inverse transform order when M>N, wherein 1D IDCT computations are performed on only M rows of the transform block to generate an interim results block.

4. The method of claim 1, further comprising:
    determining a scan pattern type for the transform block;
    decoding a column position X and a row position Y of a last non-zero coefficient in the transform block from the encoded video bit stream;
    selecting a column-row inverse transform order when the scan pattern type is a first type; and
    selecting a row-column inverse transform order when the scan pattern type is a second type, wherein performing the 1D IDCT computations further includes:
    performing the 1D IDCT computations according to the selected transform order to inversely transform the transform block to generate the residual block.

5. The method of claim 4,
wherein the first type is a vertical scan pattern; and
wherein performing the 1D IDCT computations further includes:
    performing 1D IDCT computations on only a subset of columns of the transform block to generate an interim results block, wherein a number of columns in the subset is derived from the column position; and
    performing 1D IDCT computations on all rows of the interim results block to generate the residual block.

6. The method of claim 4,
wherein the second type is a horizontal scan pattern; and
wherein performing the 1D IDCT computations further includes:
    performing 1D IDCT computations on only a subset of rows of the transform block to generate an interim results block, wherein a number of rows in the subset is derived from the row position; and
    performing 1D IDCT computations on all columns of the interim results block to generate the residual block.

7. The method of claim 4,
wherein the first type is an up-right scan pattern; and
wherein performing the 1D IDCT computations further includes:
    performing 1D IDCT computations on only a subset of columns of the transform block to generate an interim results block, wherein a number of columns in the subset is derived from the column position and the row position; and
    performing 1D IDCT computations on all rows of the interim results block to generate the residual block.

8. The method of claim 4,
wherein the second type is a down-left scan pattern; and
wherein performing the 1D IDCT computations further includes:
    performing 1D IDCT computations on only a subset of rows of the transform block to generate an interim results block, wherein a number of rows in the subset is derived from the row position and the column position; and
    performing 1D IDCT computations on all columns of the interim results block to generate the residual block.

9. The method of claim 4,
wherein the first type is a zigzag scan pattern; and
wherein performing the 1D IDCT computations further includes:
    performing 1D IDCT computations on only a subset of columns of the transform block to generate an interim results block, wherein a number of columns in the subset is derived from the column position and the row position; and
    performing 1D IDCT computations on all rows of the interim results block to generate the residual block.

10. The method of claim 4,
wherein the second type is a zigzag scan pattern; and
wherein performing the 1D IDCT computations further includes:
    performing 1D IDCT computations on only a subset of rows of the transform block to generate an interim results block, wherein a number of rows in the subset is derived from the row position and the column position; and
    performing 1D IDCT computations on all columns of the interim results block to generate the residual block.

11. The method of claim 4, further comprising:
wherein selecting a column-row inverse transform order comprises selecting the column-row inverse transform order when the scan pattern type is a zigzag scan pattern and a scan direction of a diagonal of the transform block in which the last non-zero coefficient is located is up-right; and
wherein selecting a row-column inverse transform order comprises selecting the row-column inverse transform order when the scan pattern type is a zigzag scan pattern and a scan direction of a diagonal of the transform block in which the last non-zero coefficient is located is down-left.

* * * * *